United States Patent
Townsend et al.

(10) Patent No.: US 10,319,410 B1
(45) Date of Patent: Jun. 11, 2019

(54) VIDEO STORY ASSEMBLY

(71) Applicant: Amazon Technologies, Inc., Seattle, WA (US)

(72) Inventors: Matthew Alan Townsend, Redwood City, CA (US); Peter Van Tuyl Bentley, Seattle, WA (US); Gabrielle Halberg, Redwood City, CA (US); Bryan Harris, San Francisco, CA (US); Geoff Hunter Donaldson, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 14/977,134

(22) Filed: Dec. 21, 2015

(51) Int. Cl.
| | | |
|---|---|---|
| *H04N 5/93* | (2006.01) | |
| *H04N 9/80* | (2006.01) | |
| *G11B 27/034* | (2006.01) | |
| *G11B 27/30* | (2006.01) | |
| *G11B 27/10* | (2006.01) | |

(52) U.S. Cl.
CPC .......... *G11B 27/034* (2013.01); *G11B 27/105* (2013.01); *G11B 27/30* (2013.01)

(58) Field of Classification Search
None
See application file for complete search history.

(56) References Cited

U.S. PATENT DOCUMENTS

| | | | | |
|---|---|---|---|---|
| 6,163,510 A | * | 12/2000 | Lee ................... | G06F 17/30787 360/13 |
| 8,958,646 B2 | * | 2/2015 | Huang ..................... | G06K 9/46 382/190 |
| 2011/0234615 A1 | * | 9/2011 | Hanson ................. | G06F 9/4443 345/589 |
| 2013/0279881 A1 | * | 10/2013 | Lu ........................... | H04N 5/91 386/241 |
| 2014/0023348 A1 | * | 1/2014 | O'Kelly ............... | G11B 27/031 386/278 |
| 2015/0120733 A1 | * | 4/2015 | Carceroni ......... | G06F 17/30843 707/737 |
| 2015/0155008 A1 | * | 6/2015 | Herberger ............ | G11B 27/034 386/224 |

* cited by examiner

*Primary Examiner* — Heather R Jones
(74) *Attorney, Agent, or Firm* — Pierce Atwood LLP

(57) ABSTRACT

A system and method is provided for generating an edit decision list used to render a video summarization. The system may determine a structure indicating a pacing and a sequence of video clips included in the video summarization. The system may determine weighted priority metrics for a plurality of video clips, may identify first video clips having a weighted priority metric above a first threshold and may include the first video clips in the video summarization. The system may determine similarity scores for the plurality of video clips, identify second video clips having a weighted priority metric below the first threshold but above a second threshold and a similarity score below a third threshold and may include a portion of the second video clips in the video summarization. The system may determine layouts, apply special effects and transitions and synchronize music with the video summarization based on a theme and annotation data.

20 Claims, 31 Drawing Sheets

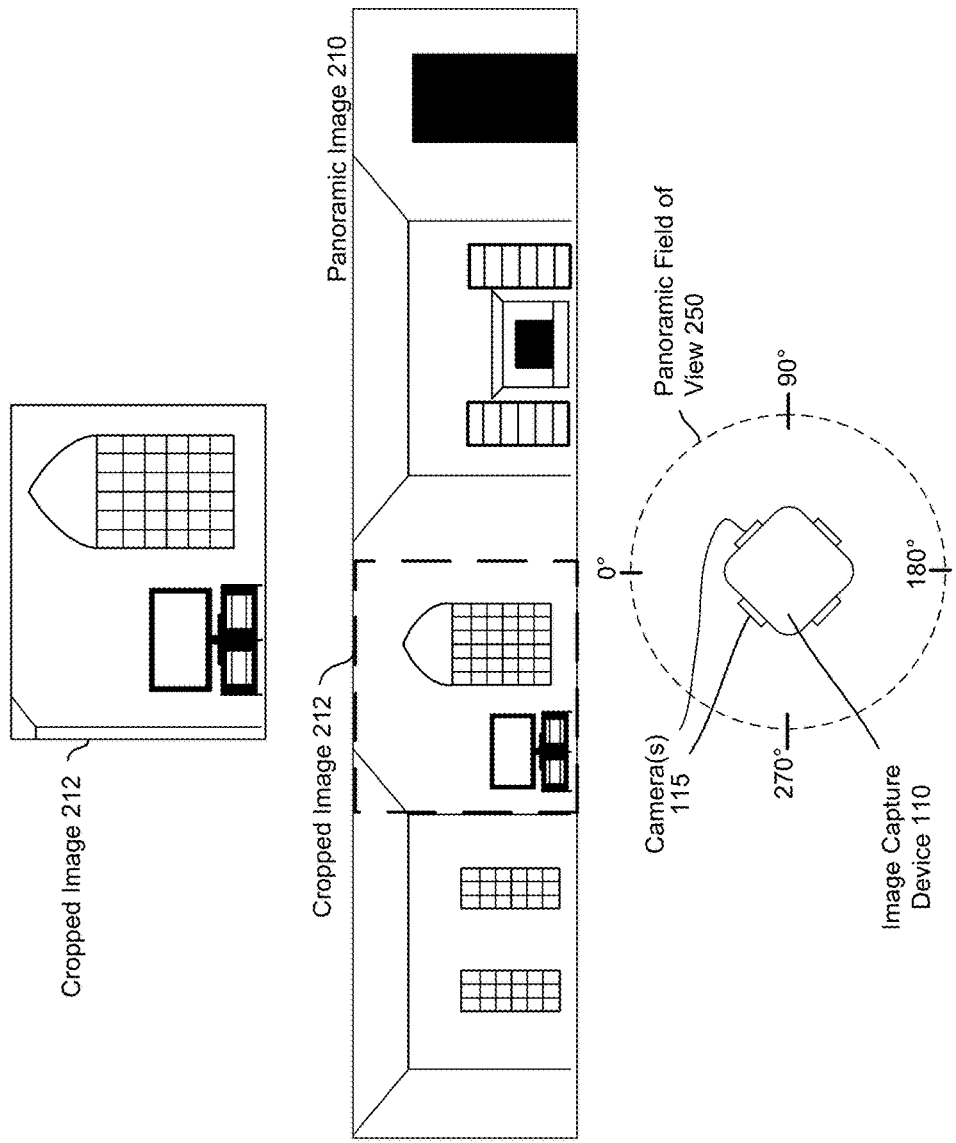

FIG. 5A

| Frame | Time, Location, Motion, Faces, Humans, Scenes, Audio, Landmarks, Objects, Pets, Directional Data, etc. |
|---|---|
| Frame 1 | |
| Frame 2 | |
| Frame 3 | |
| Frame 10 | |
| Frame 11 | |
| Frame 30 | |
| Frame 35 | |

Annotation Database 510

FIG. 5C

| Frame | Priority Metric | Time, Location, Motion, Faces, Humans, Scenes, Audio, Landmarks, Objects, Pets, Directional Data, etc. |
|---|---|---|
| Frames 1-200 | | |
| Frames 350-600 | | |
| Frames 800-1200 | | |
| Frames 1500-1650 | | |
| Frames 2000-2200 | | |
| Frames 2400-2550 | | |
| Summary Data | | |

Annotation Database 514

FIG. 5D

| Clip | Frames Included | Priority Metric | Summary Data | Time/Position of interesting moments |
|------|----------------|-----------------|--------------|--------------------------------------|
| Clip 1 | | | | |
| Clip 2 | | | | |
| Clip 3 | | | | |
| Clip 4 | | | | |
| Clip 5 | | | | |
| Clip 6 | | | | |
| Clip 7 | | | | |

Master Clip Table (MCT) 520

FIG. 5E

| Clip | Capture Date | Frames Included | Priority Metric | Summary Data | Time/Position of interesting moments |
|---|---|---|---|---|---|
| Clip 1 | 9/15/2015 | | | | |
| Clip 2 | 9/15/2015 | | | | |
| Clip 3 | 9/15/2015 | | | | |
| Clip 4 | 9/15/2015 | | | | |
| Clip 50 | 9/24/2015 | | | | |
| Clip 51 | 9/24/2015 | | | | |
| Clip 52 | 9/24/2015 | | | | |

Master Clip Table (MCT) 522

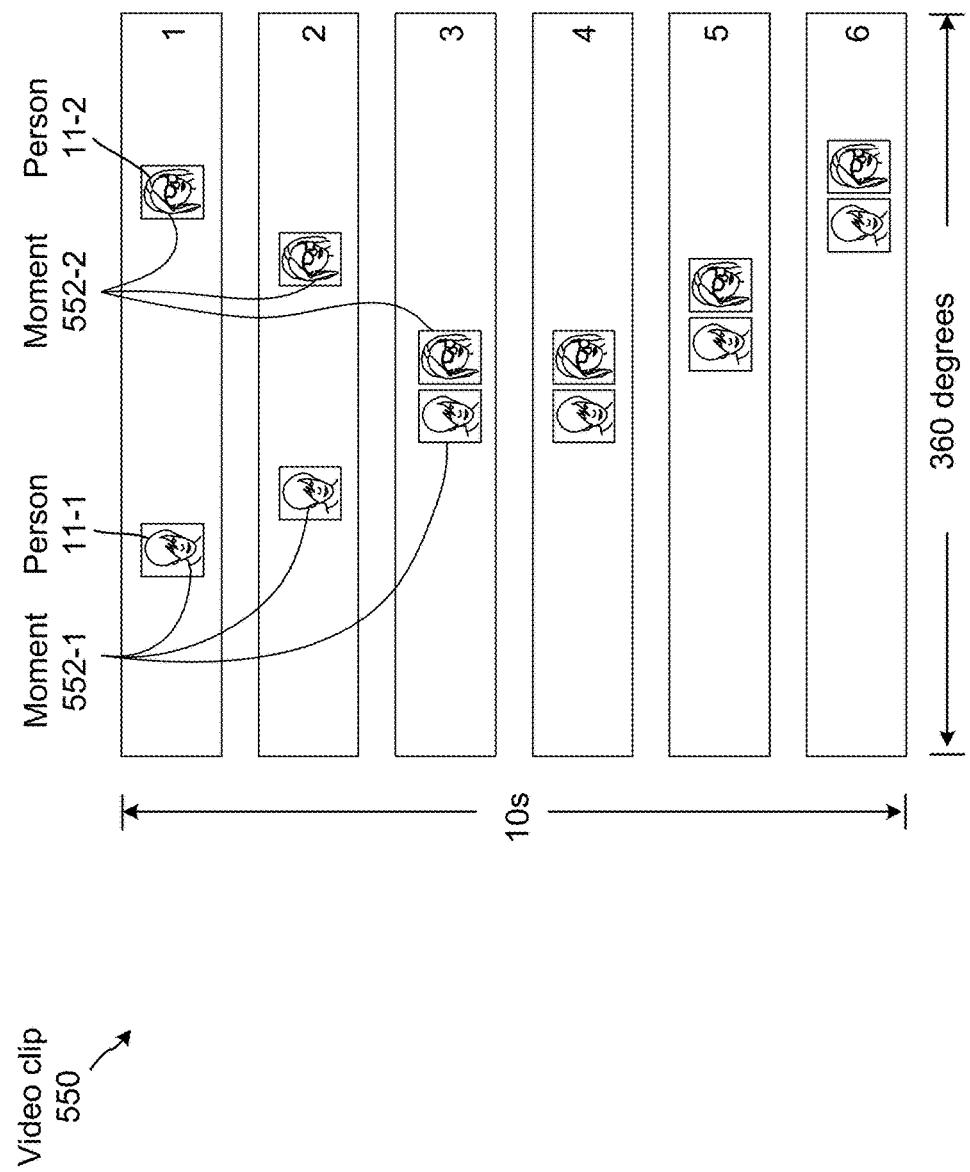

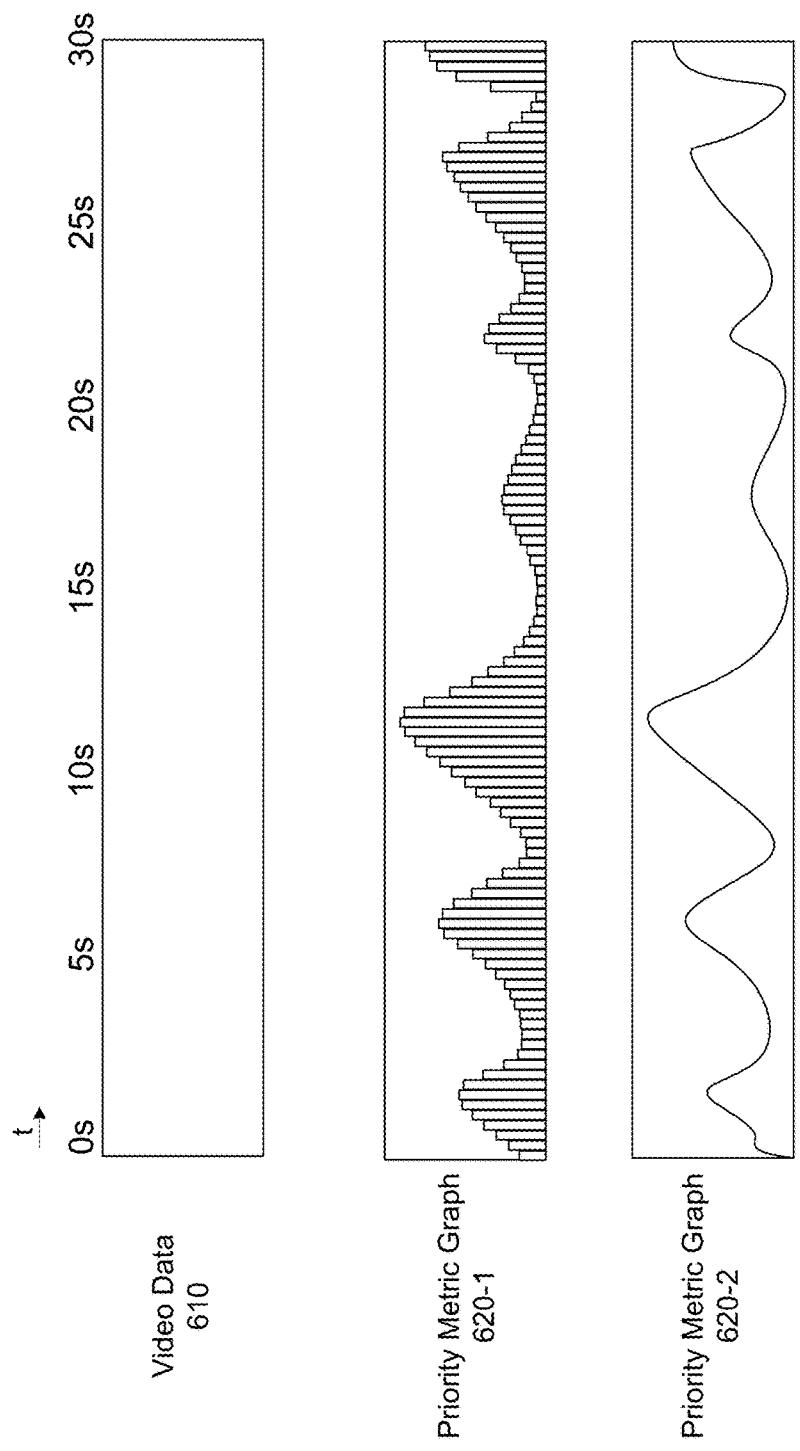

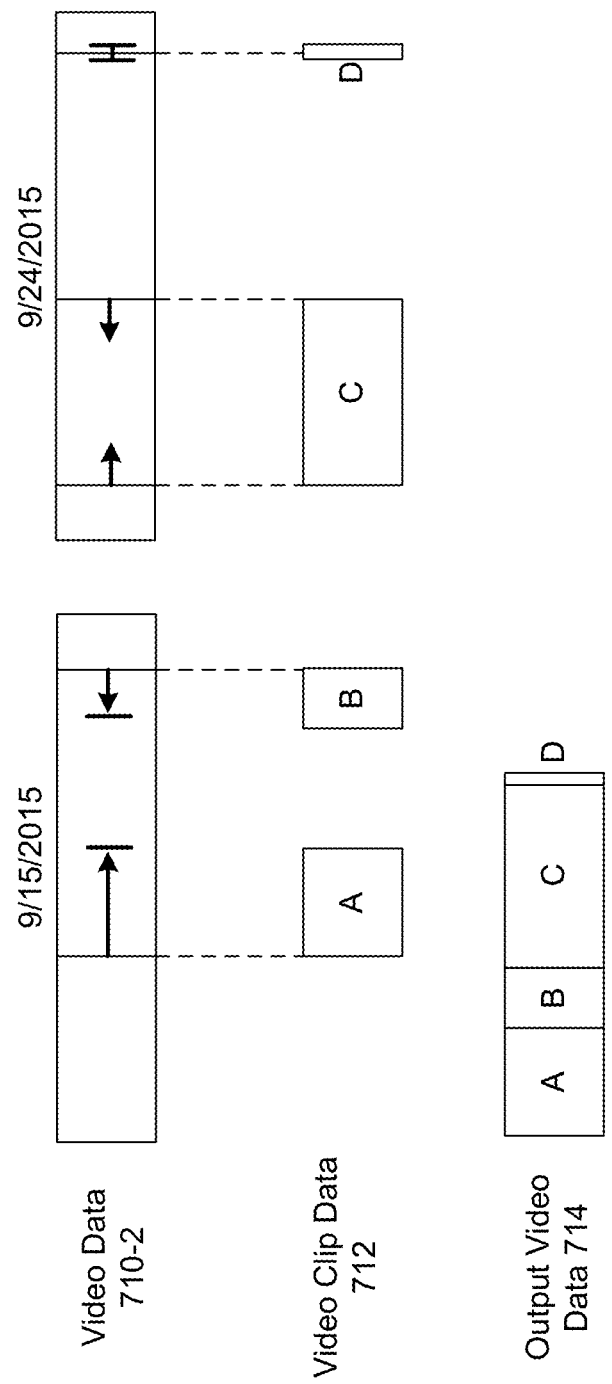

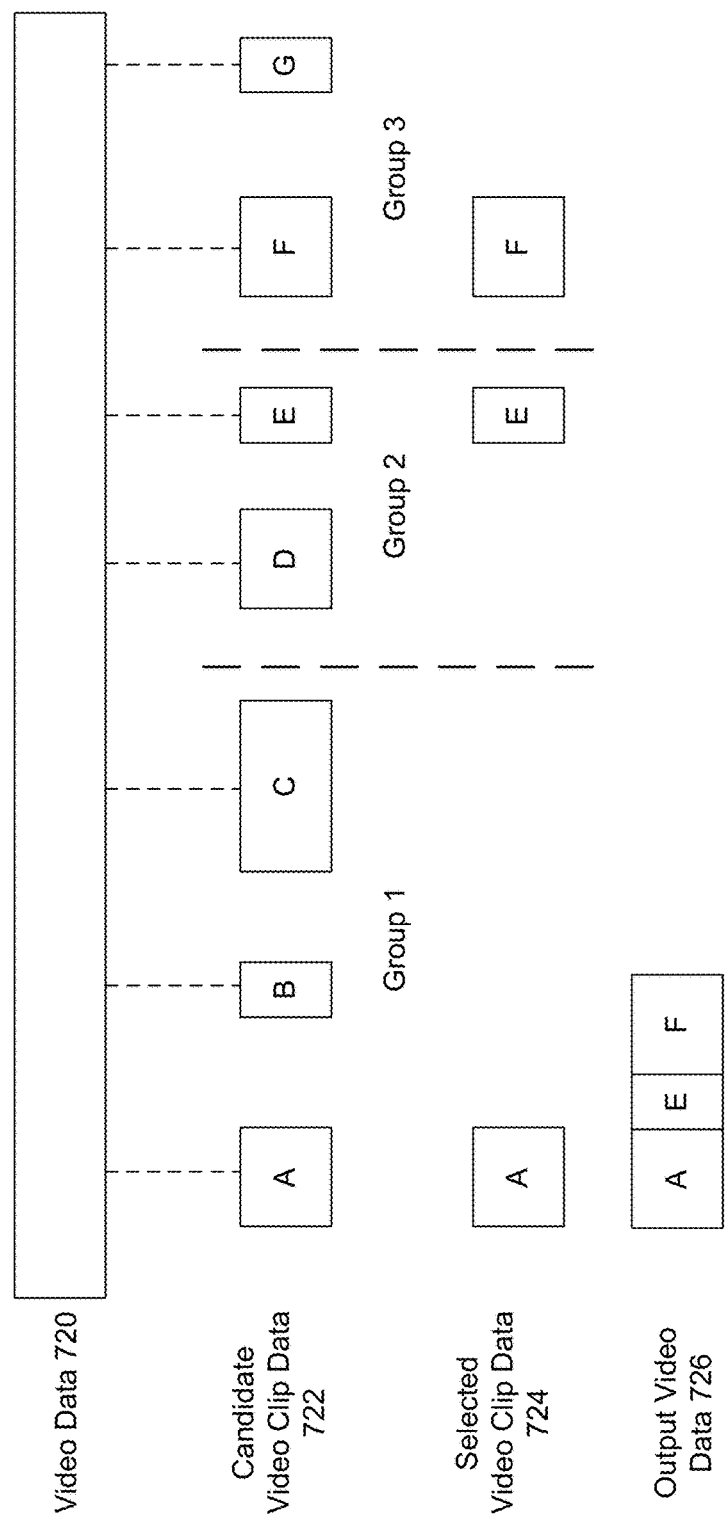

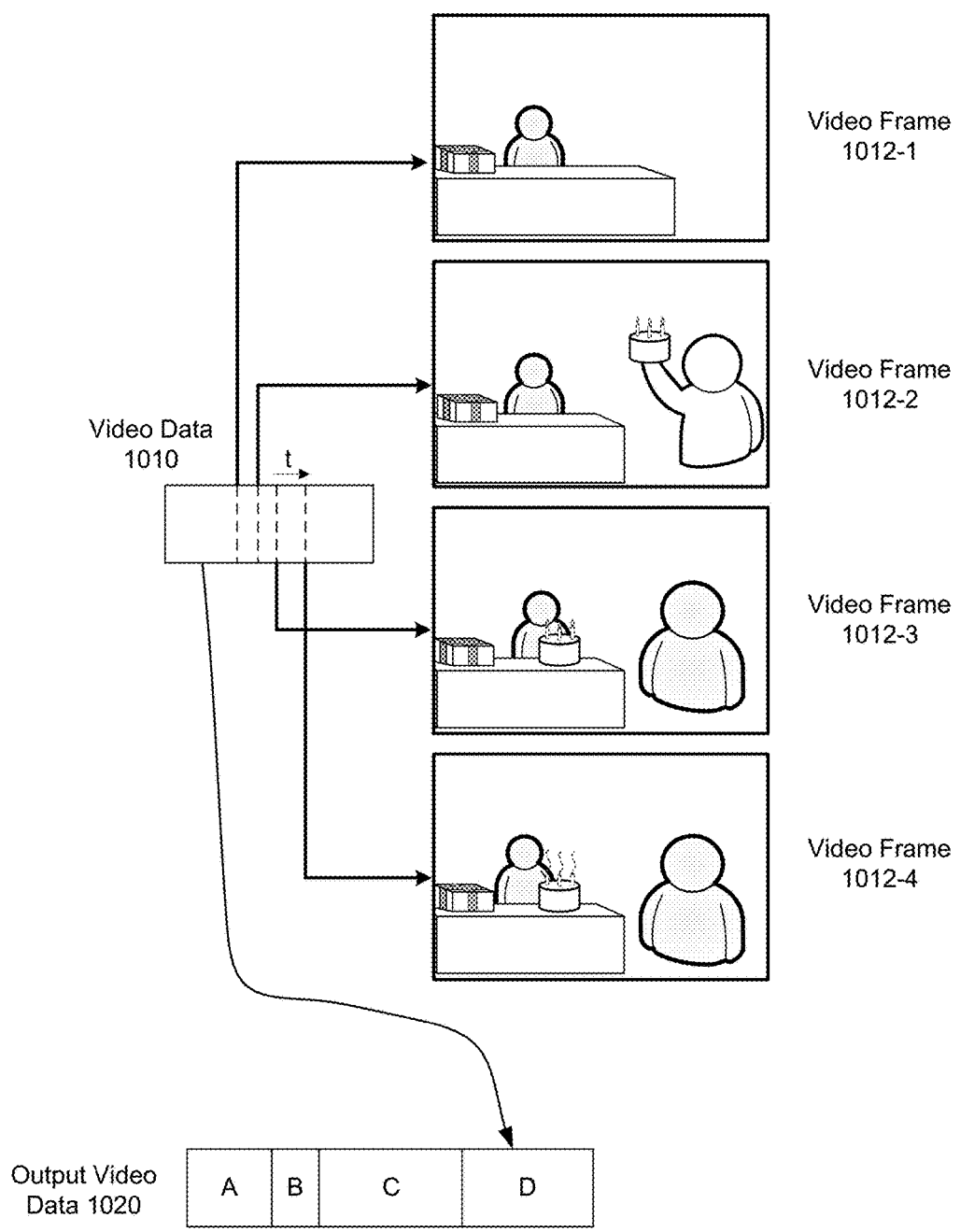

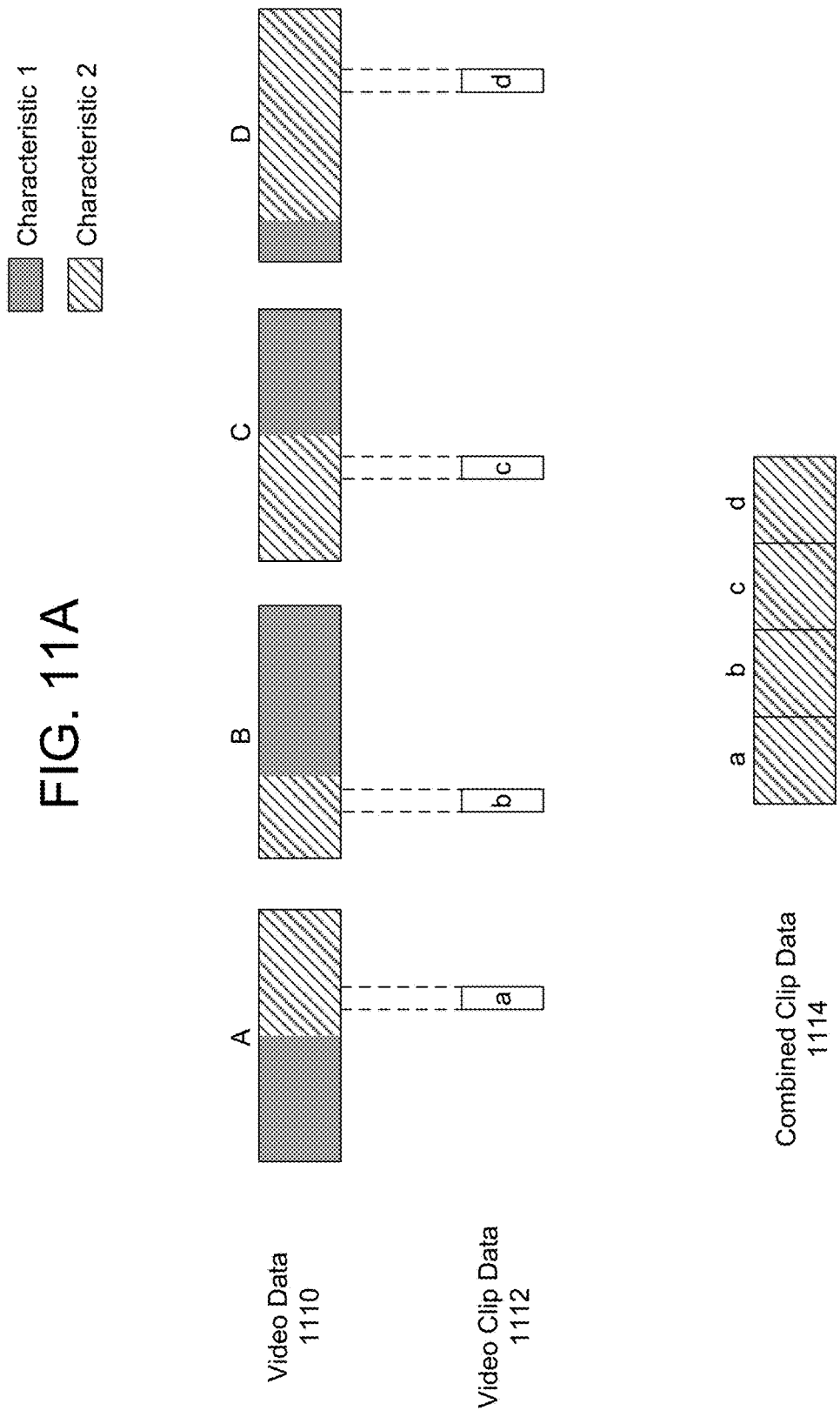

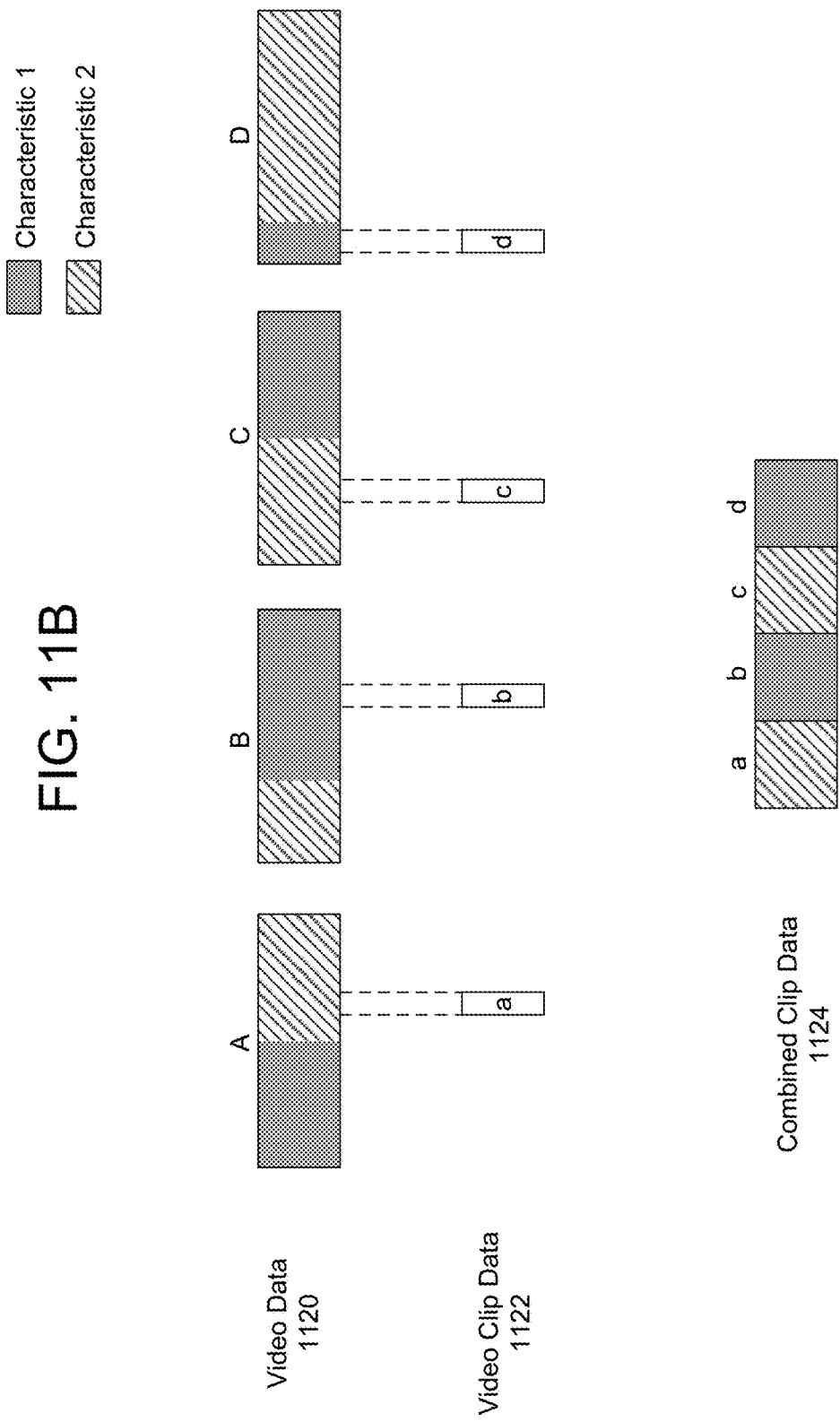

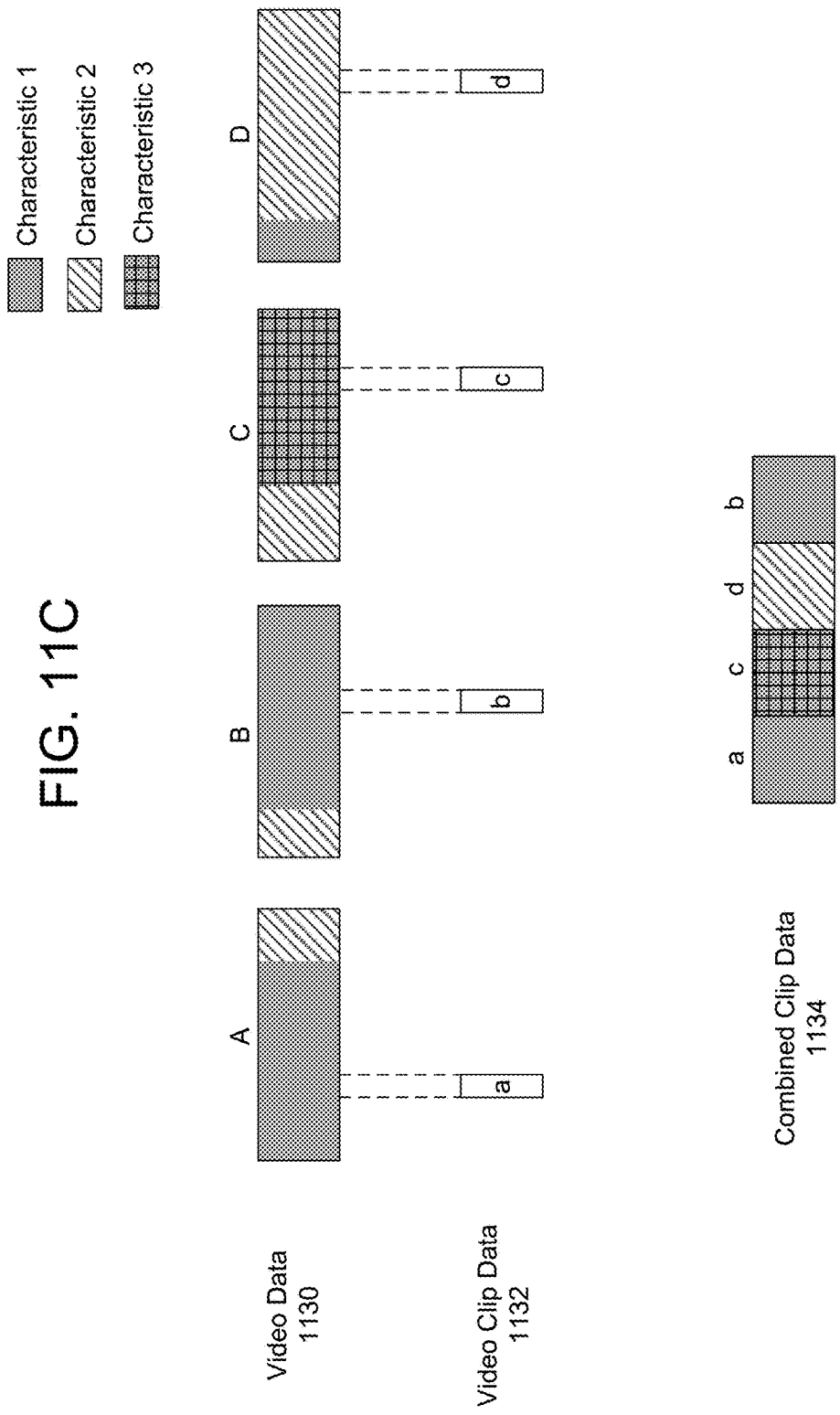

VIDEO STORY ASSEMBLY

BACKGROUND

With the advancement of technology, the use and popularity of electronic devices has increased considerably. Electronic devices are commonly used to capture videos. These videos are sometimes shared with friends and family using online systems, including social networking systems. Disclosed herein are technical solutions to improve how the videos are generated.

BRIEF DESCRIPTION OF DRAWINGS

For a more complete understanding of the present disclosure, reference is now made to the following description taken in conjunction with the accompanying drawings.

FIGS. 2A-2B illustrate examples of cropping video data in time and space according to embodiments of the present disclosure.

FIGS. 5A-5H illustrate examples of annotation data according to embodiments of the present disclosure.

FIG. 6 illustrates examples of priority metric graphs according to embodiments of the present disclosure.

FIGS. 7A-7C illustrate examples of generating video summarizations according to embodiments of the present disclosure.

FIG. 10 illustrates an example of story assembly associated with video clips of a birthday celebration according to embodiments of the present disclosure.

FIGS. 11A-11C illustrate examples of ordering video snippets according to embodiments of the present disclosure.

DETAILED DESCRIPTION

Electronic devices are commonly used to capture video data. The devices may capture video data over a lengthy period of time and some devices may capture a wide field of view in order to capture video showing a wide area. Given the amount of captured video, certain devices may upload video data to a remote server with greater processing/storage resources for purposes of editing, storage, etc. However, editing the captured videos typically requires a user to review the captured videos to select videos and edit the selected videos, requiring an amount of time and a level of commitment. As a result, captured videos are often left unedited due to the amount of time and/or a lack of commitment.

To edit the captured videos, devices, systems and methods are disclosed that generate a machined video summarization based on limited input. For example, the user may request a video summarization and a story assembler may determine a structure, select video clips, determine layouts, determine an order of the selected video clips, apply transitions, effects and music and generate an edit decision list (EDL) used to render the video summarization. The story assembler may determine the structure based on a number of video clips, a duration of the video clips and a diversity between the video clips. The story assembler may determine weighted priority metrics for the video clips using annotation data and may select video clips having a weighted priority metric above a threshold. The story assembler may select additional video clips based on weighted priority metrics and similarity scores with the selected video clips to increase a diversity between video clips in the video summarization. The story assembler may select music tracks associated with a theme for the video summarization, synchronize a pacing of the video clips to a pacing of the music tracks and transition between video clips based on the pacing of the music tracks.

Figure 1:
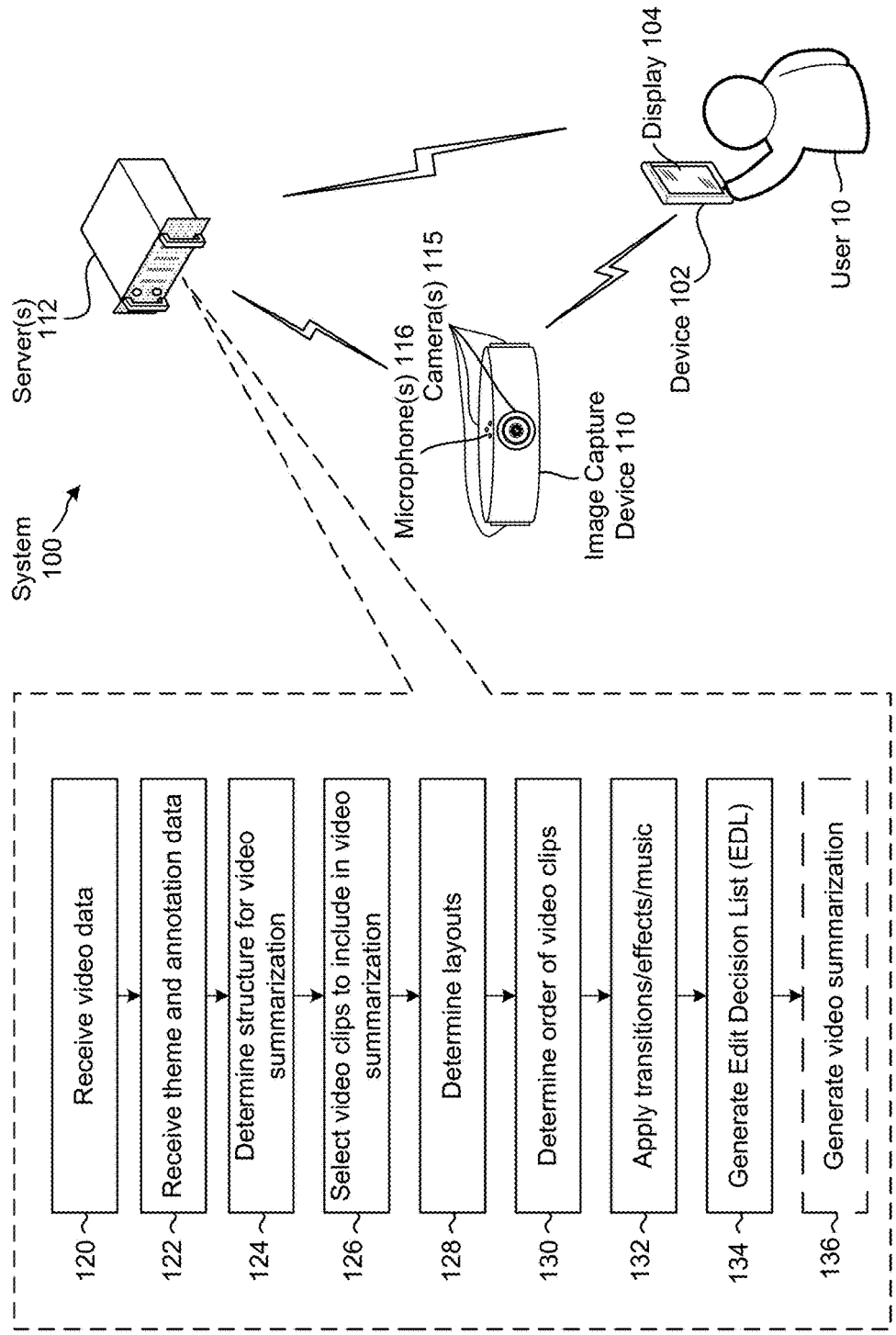
FIG. 1 illustrate overviews of systems for implementing embodiments of the present disclosure.

FIG. 1 illustrates an overview of a system 100 for implementing embodiments of the disclosure. The system 100 includes a device 102 having a display 104, an image capture device 110 (having camera(s) 115 and microphone(s) 116) and server(s) 112 all in communication with each other. While the following descriptions (of either FIG. 1 or other figures) may refer to one of the device 102, the image capture device 110 and/or the server(s) 112 performing steps illustrated in the drawings, the steps may be performed by any of the device 102, the image capture device 110 and/or the server(s) 112 without departing from the present disclosure. In addition, the device 102, the image capture device 110, the server(s) 112 or a combination thereof may receive input from a user 10 without departing from the disclosure. While FIG. 1 illustrates the system 100 including the device 102, the image capture device 110 and the server(s) 112, the system 100 may include any of the device 102, the image capture device 110, the server(s) 112 or a combination thereof without departing from the disclosure. For example, the image capture device 110 and the server(s) 112 may perform all of the steps illustrated in the drawings without communicating with the device 102.

As illustrated in FIG. 1, the server(s) 112 may receive (120) video data. In some examples, the video data may be captured by the image capture device 110 and may be panoramic video data having a field of view beyond 180 degrees, which corresponds to video data with an aspect ratio greater than 2:1. However, the present disclosure is not limited thereto and the video data may have any field of view/aspect ratio and/or may be captured by other devices. Additionally or alternatively, the server(s) 112 may receive image data. For example, the image data may be included in the video data or may be separate image data not associated with video data.

The server(s) 112 may receive (122) a theme and annotation data associated with the video data. The theme may be determined for the video summarization based on the video data and/or the annotation data, and may indicate structures, layouts, transitions, special effects and/or music to apply to the video summarization (or candidate structures, layouts, transitions, special effects and/or music from which to select). The annotation data may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s).

The server(s) 112 may determine (124) a structure for the video summarization indicating a pacing and a sequence of video clips to be included in the video summarization. For example, the sequence may include an opening, a body and a closing for a video summarization associated with an event, year in review or the like. Thus, the structure may specify an establishing shot to set a scene for the opening, a series of specific scenes in chronological order with bridges between them for the body and a pivotal scene or ending of the event for the closing. As another example, the structure may be fast paced and may include a number of video clips for a video summarization associated with a road trip or other dynamic event. Thus, the structure may prioritize motion and a fast pacing between video clips without regard to chronology. In some examples, the server(s) 112 may select a structure from a group of existing structures, although the disclosure is not limited thereto.

The server(s) 112 may select the sequence based on a number of video clips to include in the video summarization. For example, a relatively small number of video clips may be organized chronologically or using other criteria without regard to a narrative, whereas a relatively large number of video clips may be organized in a narrative sequence with individual video clips selected to narrate the story. In some examples, the sequence may specify multiple primary tracks (e.g., narrations) and may alternate between them. For example, the server(s) 112 may identify a first track A and a second track B and may alternate between track A and track B (e.g., A-B-A-B). Additionally or alternatively, the server(s) 112 may organize video clips based on related content, such as displaying a first video clip representing an event and a second video clip representing a reaction to the event sequentially or at the same time.

The server(s) 112 may select (126) video clips to include in the video summarization. The server(s) 112 may determine a number of video clips to select based on the video data and/or the annotation data. For example, the server(s) 112 may use a computer vision algorithm to identify interesting moments, such as by determining a priority metric for individual video frames in the video data and grouping interesting shots (e.g., video frames having a priority metric exceeding a threshold) together. The server(s) 112 may select the most interesting moments (e.g., group of video frames associated with a high priority metric) to include in the video summarization. In some examples, the server(s) 112 may select the video clips exclusively based on the priority metric, prioritizing moments associated with a high priority metric.

In other examples, the server(s) 112 may select the video clips based on the priority metric but also based on a similarity score and/or diversity score to add variety to the video summarization. For example, the server(s) 112 may determine a similarity score and/or diversity score for an individual video clip (or a group of video clips), the similarity score indicating a similarity between the individual video clip and other video clips and the diversity score indicating a difference between the individual video clip and other video clips (e.g., a uniqueness of the individual video clip). The similarity score/diversity score may be based on a visual composition of the video clips, such as a number of faces present, motion, visual components or other characteristics included in the annotation data. Thus, by selecting first video clips having a high priority metric and second video clips having a high diversity score, the server(s) 112 may add variety to the video summarization and include a number of different types of video clips. For example, the first video clips may emphasize individual faces or groups of faces, whereas the second video clips may emphasize environmental shots (e.g., establishing the environment) or textural (e.g., interesting shots that that don't contain people such as a sky with clouds, a forest or the like) clips that set a scene. By combining the first video clips and the second video clips, the video summarization may include both the people present at the event and the environmental/textural aspect of the event.

The server(s) 112 may determine a frame priority metric for individual video frames, a moment priority metric for an individual moment (including a series of video frames) and/or a clip priority metric for an individual video clip (including one or more moments). The frame priority metric may be used to identify interesting frames to determine moments. For example, the server(s) 112 may identify a group of video frames in proximity to each other having a high frame priority metric and may generate a moment including the group of video frames. The moment priority metric may be used to place moments within the video summarization, such as by highlighting moments having a high moment priority metric relative to the other moments. The server(s) 112 may determine the most interesting moment using priority metrics over time, by grouping priority metrics or determine peaks within the priority metrics or selecting a highest priority metric for each unique scene. For example, a first scene may include a number of interesting moments compared to a second scene, but the server(s) 112 may select a first moment having a highest moment priority metric from the first scene and a second moment having a highest priority metric from the second scene, even other moments in the first scene have a higher moment priority metric than the second moment. Thus, the server(s) 112 may add variety to the video summarization. The server(s) 112 may identify unique scenes by determining transitions within the video data.

In some examples, the annotation data may indicate a priority metric associated with the video clips, and the server(s) 112 may select the video clips based on the priority metrics included in the annotation data. However, the disclosure is not limited thereto and the server(s) 112 may determine weighted priority metrics and may select the video clips based on the weighted priority metrics. For example, the server(s) 112 may determine a weighting associated with one or more characteristics indicated by the annotation data and may determine the weighted priority metric for a video clip using the weighting, as will be described in greater detail below.

The server(s) 112 may determine weighted characteristics to prioritize using one of several techniques. As a first example, the server(s) 112 may receive selected characteristics indicating one or more characteristics to include in the video summarization, such as a particular face, scene, object or the like. For example, the server(s) 112 may receive selected characteristics indicating a birthday celebrant and a birthday cake that are represented in the video data and the server(s) 112 may determine weighted priority metrics that prioritize the birthday celebrant and the birthday cake. As a second example, the server(s) 112 may determine favorite characteristics based on previous input, such as feedback from a previous video summarization(s). For example, the server(s) 112 may determine that previous video summarizations feature a first person (e.g., a chef) and a first type of object (e.g., cakes or other baked goods) and may determine weighted priority metrics that prioritize the first person and the first type of object. As a third example, the server(s) 112 may determine theme characteristics associated with the received theme. For example, the server(s) 112 may determine first theme characteristics associated with a road trip theme, such as movement, road signs, outside scenery or the like, and may determine weighted priority metrics that prioritize the first theme characteristics. Similarly, the server(s) 112 may determine second theme characteristics associated with a birthday theme, such as a cake, balloons, gifts or the like, and may determine weighted priority metrics that prioritize the second theme characteristics.

In some examples, the server(s) 112 may select a relatively large weight relative to an average weight in order to prioritize the weighted characteristics. For example, the server(s) 112 may prioritize a first characteristic (e.g., a birthday celebrant) heavily such that first weighted priority metrics corresponding to video clips that include the birthday celebrant are much higher than second weighted priority metrics corresponding to video clips that don't include the birthday celebrant. Thus, the server(s) 112 may select only video clips that include the weighted characteristics. However, the disclosure is not limited thereto and the server(s) 112 may select a slightly larger weight relative to the average weight to prioritize the weighted characteristics slightly. For example, the server(s) 112 may emphasize the weighted characteristics without removing interesting video clips that don't include the weighted characteristics.

While the previous examples illustrate the server(s) 112 emphasizing weighted characteristics (e.g., increasing a weight relative to the average weight), the disclosure is not limited thereto. Additionally or alternatively, the server(s) 112 may de-emphasize the weighted characteristics to reduce a weighted priority metric associated with a video clip including the weighted characteristics. For example, the weighted characteristics may indicate an ex-spouse to exclude from the video summarization and the server(s) 112 may associate the ex-spouse with a low weight relative to the average weight and may determine low weighted priority metrics for video clips including the ex-spouse.

In some examples, the server(s) 112 may determine more than one set of weighted priority metrics. For example, the server(s) 112 may determine first weighted priority metrics using first weights, may select first video clips using the first weighted priority metrics, may determine second weighted priority metrics using second weights and may select second video clips using the second weighted priority metrics.

The server(s) 112 may select video clips using the priority metrics included in the annotation data and/or the weighted priority metrics without departing from the present disclosure. Therefore, as used herein, "priority metrics" may refer to the priority metrics included in the annotation data and/or weighted priority metrics, and in some examples the server(s) 112 may store the weighted priority metrics in the annotation database for future processing.

The number of video clips selected by the server(s) 112 may depend on a duration of the video data (e.g., an overall length of time captured by the video data), a number of video clips included in the video data, the clip priority metrics (e.g., number of interesting video clips having a clip priority metric above a threshold), and/or the similarity scores/diversity scores (e.g., number of unique video clips). For example, the server(s) 112 may generate a relatively short video summarization for video data with static or redundant information (e.g., few unique video clips) over a long duration or may generate a relatively long video summarization for video data with dynamic information (e.g., many unique video clips) over a short duration.

The server(s) 112 may determine (128) layouts for the video summarization. A layout may indicate how many of the selected video clips are displayed simultaneously in the video summarization during a first period of time and respective pixel coordinates associated with the selected video clips within a video frame of the video summarization. For example, a layout may indicate that a single video clip is to be displayed in the video frame at one time or may indicate that two video clips are to be displayed side by side within the video frame. The server(s) 112 may determine layouts by trying multiple combinations of video clips that fit in the layouts available, determining layout scores for the layouts and selecting the layout with the highest layout score. The layout score may be determined based on how well the video clips fit in the layout, how the layout looks or the like using various algorithms. In some examples, the layouts may be animated and/or dynamic and may rotate, bend, twist or include other animations. Therefore, the server(s) 112 may determine the animation effect to apply to a selected layout.

The layouts may be determined based on the theme, as different themes may have different layouts. In addition to the layout score, the moment priority metric and/or clip priority metric may be used to determine the best layout. Additionally or alternatively, the server(s) 112 may determine the best layout based on an aspect ratio of the moment/video clip. For example, a video clip may include a relatively wide field of view and therefore require a wide aspect ratio, which may match a layout including two video clips in a top and bottom configuration. Therefore, a shape of a region of interest within a moment may suit particular configurations over others and the server(s) 112 may use this information to select the best layout.

The server(s) 112 may determine (130) an order for the video clips within the video summarization. The order may indicate times to begin playback in the video summarization for individual video clips. For example, the order may be determined based on chronology, to increase diversity between video clips, to provide context or the like. As an example, a first video clip (e.g., an environmental shot) may provide context for a second video clip (e.g., an up close shot of a person's face) and the first video clip may therefore be positioned before the second video clip. In addition, the order may be determined based on the layouts determined in step 128. For example, the server(s) 112 may determine a layout including three video clips and may then determine an order of the three video clips within the video summarization based on one or more of the video clips.

In some examples, the order may be mainly chronological, with the video clips ordered by capture date or the like. However, the present disclosure is not limited thereto and the order may be selected to establish a narrative. For example, the establishing shot may use foreshadowing and include a video clip out of order to establish the scene and/or narrative. Similarly, the closing shot may be out of order and may be selected based on a priority metric or other criteria that indicates that the closing shot is important to the narrative.

The server(s) 112 may apply (132) transitions, special effects and music to the video summarization. For example, the selected theme may be associated with certain transitions, special effects, music tracks or the like and the server(s) 112 may apply the transitions, special effects, music tracks or the like to some or all of the video clips included in the video summarization. The transitions may indicate how the video summarization transitions from a first video clip to a second video clip, such a cut, a fade, a slide, an animation zooming/panning within a video clip, or other transitions. In some examples, more complicated transitions may be used, such as transitioning from a first layout including two video clips and a second layout including three video clips. For example, the transition may include the two video clips in the first layout moving upwards as they are replaced by two new video clips and a third video clip slides into position below in the second layout.

The server(s) 112 may apply special effects based on the theme, such as scripted sequences, geometric shapes, color overlays, texture, vignette, film scratches, desaturation, black and white, flash bulb effect or the like. Thus, the server(s) 112 may apply one or more special effects associated with the selected theme to some or all of the video clips. For example, some of the special effects may be applied globally across the video summarization, whereas the server(s) 112 may apply a first special effect (e.g., vignette and film scratches) to a first video clip and a second special effect (e.g., flash bulb effect) to a second video clip in order to add variety to the video summarization.

The server(s) 112 may determine a list of music that is associated with the selected theme and may select music tracks and synchronize the video clips with the selected music tracks. As an example, the music tracks may be instrumental tracks (although the disclosure is not limited thereto) having an audio pacing and the server(s) 112 may determine a video pacing associated with the video clips and may match the video pacing to the audio pacing. For example, a steady theme may be associated with changing video frames every 2 measures while an upbeat theme may be associated with changing video frames every half measure. Additionally or alternatively, the server(s) 112 may coordinate transitions between video clips with the audio pacing. The audio pacing and/or video pacing may vary throughout the video summarization, such as starting with a slow pace, accelerating to a fast pace and ending with a slow pace.

The server(s) 112 may generate (134) an Edit Decision List (EDL) to render the video summarization. The EDL may be a format that describes an editing sequence, including an ordered list of the selected video clips and the respective pixel coordinates associated with the selected video clips within the video summarization. For example, the EDL may be a text-based list of commands that may specify that clip A spans from frame 37 to frame 219, clip B spans from frame 220 to frame 520 and clip C spans from frame 520 to frame 820. However, the duration of each clip may vary and the disclosure is not limited thereto. In addition, video clips may overlap and be displayed simultaneously using various layouts. Additionally, the EDL may specify transition effects, special effects, music tracks or other rendering information required to render the video summarization.

The server(s) 112 may optionally generate (136) the video summarization using the EDL. For example, the server(s) 112 may generate a video summarization that may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and a location of the video clip and pixel coordinates of the video clip in a video frame of the video summarization may be indicated by the EDL. In some examples, the server(s) 112 may display the video summarization and receive feedback to modify the video summarization. The server(s) 112 may generate a second EDL and optionally generate a second video summarization using the second EDL.

The video data may include multiple video segments (e.g., discrete video segments captured at different times) or may include a single video segment from a beginning time to an ending time. A video segment may include a single video clip (e.g., six video segments corresponds to six video clips captured at different times) and/or multiple video clips included in the video segment (e.g., a first portion of a video segment corresponds to a first video clip and a second portion of the video segment corresponds to a second video clip). In some examples, the server(s) 112 may extract individual video clips included in the video data based on priority metrics and the annotation data. For example, the server(s) 112 may determine a priority metric (e.g., interesting score) for individual video frames within the video data using the annotation data and/or retrieve priority metrics stored in the annotation data. As an example, a video frame including multiple faces interacting with identifiable objects, good lighting, etc. may correspond to a high priority metric, whereas a video frame including a landscape with no faces or identifiable objects may correspond to a low priority metric. Thus, the priority metrics may correspond to a likelihood of interesting content and the server(s) 112 may extract individual video clips based on the priority metrics. For example, the server(s) 112 may identify a series of video frames (e.g., 5-60 seconds) having a priority metric above a threshold and may generate a video clip including the series of video frames. Additionally or alternatively, the server(s) 112 may identify an interesting portion of a video segment using the priority metric values and may generate a video clip including the interesting portion.

While multiple aspects/embodiments/features may be described on their own (e.g., separate examples illustrated in the following figures), the system 100 may incorporate multiple different features/embodiments as part of the same system without departing from the scope of the disclosure. Thus, the system 100 may include any and all combinations of the features illustrated in the drawings without departing from the present disclosure.

As used herein, panoramic video data may include video data having a field of view beyond 180 degrees, which corresponds to video data with an aspect ratio greater than 2:1. As an example, a frame of panoramic video data may have a resolution of 5200 pixels by 1080 pixels. The panoramic video data may include data output from the one or more image sensors after being processed and/or compressed into a viewable video format. However, the present disclosure is not limited thereto and the video data may be video data having any aspect ratio without departing from the disclosure. The video data may include an edited clip or a video clip generated from larger video data, or, in some examples, the video data may be unedited video data captured by the camera(s) 115. For example, a user 10 of the device 102 may identify relevant video clips, or the user 10, the image capture device 110 and/or the server(s) 112 may identify portions of unedited video data for additional editing (e.g., such as specifying events of interest or regions of interest within the unedited video data).

As used herein, a video clip may be a short section of the video data (having any aspect ratio) including content determined to be "interesting" or desirable for purposes of video summarization. For example, video data may include several video clips that the device 102, the image capture device 110 and/or the server(s) 112 may extract from the video data. The device 102, the image capture device 110 and/or the server(s) 112 may determine a priority metric associated with a video clip using annotation data, the priority metric corresponding to a likelihood of interesting content, and may extract video clips based on the priority metric. Similarly, as used herein a moment may be a region of interest within a video clip. For example, a video clip may include one or several moments associated with a region of interest (e.g., position within the video frame, object/person within the video frame, etc.). A moment may include a bounding box around an interesting object or section of the video clip over time, and additional data may indicate a per-frame priority metric for the moment, a position of a detected face in the video clip, an identity of the detected face, or the like.

As used herein, a video tag is a tag (i.e., data structure) including annotation information that may be used in video summarization and/or rendering information that may be used to render a video. Examples of annotation information include an object, a person, an identity of a person, an angle relative to a camera axis, an area associated with a subject, a position associated with the subject, a timestamp (e.g., a time associated with receiving user input, a time associated with an individual video frame, a range of time associated with a sequence of video frames or the like) and/or other annotation data associated with video frame(s). Examples of rendering information include information used to render a video, such a sequence/order of video data in the rendered video, a begin point and end point associated with individual video clips included in the video, coordinates associated with cropping/panning within the video data, a theme, special effects, filters, layouts and/or transitions between video clips, audio data (e.g., musical track(s) or the like) and/or other editing effects known to one of skill in the art. As described in greater detail above with regard to FIG. 1, the server(s) 112 may determine a video snippet from video data and include parameters of the video snippet in a video tag for video summarization. Therefore, any steps describing processing and/or editing of the video data may also refer to storing processing information in a video tag for subsequent video processing and/or editing of the video data.

The server(s) 112 may render the video (e.g., generate the video summarization) using rendering information included in the generated video tags and/or the edit decision list (EDL). For example, the rendering information may indicate an order of the selected video clips, the begin point and end point associated with the individual video clips, the selected theme, the selected panning for the individual video clip(s), the special effects, the audio data and/or other editing steps. As a first example, a first video tag may indicate the order of the selected video clips, a second video tag may indicate the begin point and the end point associated with a single video clip, etc. As a second example, a single video tag may include multiple edits, such as a first video tag indicating the begin point and the end point associated with a single video clip along with the selected panning for the single video clip and the special effects and/or audio data associated with the selected video clip. The video tags may correspond to individual video clip or a group of video clip without departing from the disclosure.

A moment may be associated with a region of interest within a video clip, which may include a time range (e.g., beginning frame and an ending frame) and a position (e.g., x and y pixel coordinates) within the video data. The server(s) 112 may generate video clips based on the time range associated with the moment, but a video clip may include an entirety of the pixel coordinates associated with the video data over the time range. Therefore, the server(s) 112 may determine a region of interest associated with a moment and may determine framing windows that include a portion of the pixel coordinates (e.g., a cropped image). Thus, the server(s) 112 may render the framing windows when generating the video summarization, such that the video summarization only includes the portion of the pixel coordinates associated with the region of interest (indicated by the framing windows) over the time range.

The image capture device 110 may capture the panoramic video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the panoramic video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110 as long as the image capture device 110 captures panoramic video data having an aspect ratio exceeding 2:1.

The panoramic video data may include a plurality of video frames (e.g., sequence of image frames, each image frame associated with a particular time) and the portion of the panoramic video data displayed on the display 104 (e.g., cropped image, image data, etc.) may be associated with a position (e.g., x and y pixel coordinates) within the panoramic video data, a direction (e.g., a directional viewpoint included in the panoramic video data) associated with the panoramic video data and/or an angle (e.g., an azimuth) of the portion relative to a reference location (e.g., a front of the video/image capturing device). The device 102 may determine a cropped image (e.g., image data) within panoramic image data (e.g., a single video frame of the panoramic video data) associated with an angle or may determine the angle based on a position of the cropped image within the panoramic image data. Thus, the cropped image may include a portion of the panoramic image data and dimensions of the cropped image may be smaller than dimensions of the panoramic image data, in some examples significantly smaller. The output video data may include a plurality of cropped images. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The panoramic video data may have an aspect ratio exceeding 2:1. An aspect ratio is a ratio of one dimension of a video frame to another dimension of a video frame (for example height-width or width-height). For example, a video image having a resolution of 7680 pixels by 1080 pixels corresponds to an aspect ratio of 64:9 or more than 7:1. While the panoramic video data (e.g., panoramic image) may have a certain aspect ratio (for example 7:1 or other larger than 2:1 ratio) due to a panoramic/360 degree nature of the incoming video data (Which may result from a single panoramic camera or multiple images taken from multiple cameras combined to make a single frame of the panoramic video data), the portion of the panoramic video data displayed on the display 104 (e.g., cropped image) may have an aspect ratio that is likely to be used on a viewing device. As a result, an aspect ratio of the portion of the panoramic video data displayed on the display 104 (e.g., cropped image) may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the cropped image 12 may vary based on user preferences.

Pixel coordinates may specify a position within the panoramic image. For example, if the panoramic image has a resolution of 7680 pixels by 1080 pixels, a pixel coordinate of a bottom left pixel in the panoramic image may have pixel coordinates of (0, 0), a pixel coordinate of a top left pixel in the panoramic image may have pixel coordinates of (0, 1080), a pixel coordinate of a top right pixel in the panoramic image may have pixel coordinates of (7680, 1080) and a bottom right pixel in the panoramic image may have pixel coordinates of (7680, 0). Similarly, if the cropped image has a resolution of 1920 pixels by 1080 pixels, a pixel coordinate of a bottom left pixel in the cropped image may have pixel coordinates of (0, 0) in the panoramic image, a pixel coordinate of a top left pixel in the cropped image may have pixel coordinates of (0, 1080) in the panoramic image, a pixel coordinate in a top right pixel in the cropped image may have pixel coordinates of (1920, 1080) in the panoramic image and a bottom right pixel in the cropped image may have pixel coordinates of (1920, 0) in the panoramic image.

Video summarization may summarize lengthy video data (e.g., an hour of recording) in a short video summary (e.g., 2-5 minutes) highlighting the interesting events that occurred in the video data. Therefore, each video clip in the video summary may be relatively short (e.g., between 5-60 seconds) and the portion of the video data included in the video clip may be determined based on the video tags and/or annotation data, thus including in the video summarization the portions of video data (including the objects, angles, and times or the like) indicated by a user 10 and/or determined to be interesting (e.g., priority metric exceeding a threshold) by the server(s) 112. For example, a user 10 may be attending a party and may want to capture the party without being distracted from the party itself. Therefore, the user 10 may locate the image capture device 110 at a central location in a room during the party and may optionally generate tags using the device 102 to identify moments of particular interest to be included in the video summarization. The image capture device 110 may capture video data throughout the party, but the user 10 may generate tags for specific moments or specific guests at the party. The server(s) 112 may generate additional video tags and/or generate a number of video clips using the video tags, where the video clips are associated with a particular time/timestamp, date, and/or position based on the video tags. Additionally or alternatively, the server(s) 112 may determine video clips using annotation data, for example by determining a priority metric for individual video frames in the video data and generating video clips including video frames having a highest priority metric value. The video clips may be ordered chronologically in the video summary, where included video clips are ordered by their relative recording time/timestamp, but the present disclosure is not limited thereto and the server(s) 112 may determine an order of the video clips. The video summarization may also include a collection of still images, in a manner akin to a picture slideshow, where the still images are selected from the video data and may include images that were the subject of tags received as described above.

As part of generating the video summarization, the device 102 may display output video data and may request input from a user 10 of the device 102. For example, the user 10 may instruct the device 102 to generate additional video data (e.g., create an additional video summarization), to modify an amount of video data included in the output video data (e.g., change a beginning time and/or an ending time to increase or decrease a length of the output video data), to modify a portion of the video data included in the output video data (e.g., zoom or pan within the video data), shift a time window associated with a video snippet within the output video data (e.g., change a beginning time of a video snippet without changing the time window), specify an object of interest, specify an event of interest, specify or modify an angle associated with the output video data, increase or decrease a panning speed or the like. Thus, the server(s) 112 may generate the output video data, the device 102 may display the output video data to the user 10 and receive feedback from the user 10 and the server(s) 112 may generate additional or different output video data based on the user input. The video tags may be configured to be similarly modified by the user 10 during a video editing process.

FIG. 2A illustrates an example of panoramic video data according to embodiments of the present disclosure. As illustrated in FIG. 2A, an image capture device 110 may use camera(s) 115 to capture panoramic video data 210 including a panoramic field of view 250. The panoramic video data may include panoramic image 210 having a field of view above 180 degrees and/or an aspect ratio exceeding 2:1. For example, FIG. 2A illustrates the panoramic image 210 corresponding to the panoramic field of view 250 of 360 degrees, with the angle markers shown in dotted lines to correspond to angles relative to the image capture device 110. Such angle markers may or may not be displayed during implementation and are provided here for illustration purposes. The present disclosure is not necessarily limited to panoramic video data and may include any video data, for example video data having a field of view beyond what is normally displayed using a 16:9 aspect ratio on a television. The panoramic image 210 may be generated using one camera or a plurality of cameras without departing from the present disclosure.

While the image capture device 110 may capture video data such as the panoramic image 210, the device 102, the image capture device 110 and/or the server(s) 112 may determine cropped images, such as cropped image 212, for each frame of the video data. By controlling a position of the cropped image 212 within the panoramic image 210, the device 102/image capture device 110/server(s) 112 may effectively crop the video data and generate output video data using a 16:9 aspect ratio (e.g., viewable on high definition televisions without horizontal black bars) that emphasizes desired content within the cropped image 212. However, the present disclosure is not limited to a 16:9 aspect ratio and the aspect ratio may vary.

A position of the cropped image 212 within the panoramic image 210 may be expressed as an angle of view relative to a fixed location of the image capture device 110, such as a front of the image capture device 110. For example, the angle of view may be an azimuth, which is an angular measurement in a spherical coordinate system that describes when a vector from the image capture device 110 to a point of interest is projected perpendicularly onto a reference plane. The angle between the projected vector and a reference vector on the reference plane is called the azimuth. As illustrated in FIG. 2A, the angle of view (e.g., azimuth) for the cropped image 212 is 0 degrees, indicating that the cropped image 212 is at a reference location relative to the image capture device 110, such as in front of the image capture device 110.

Figure 2B:
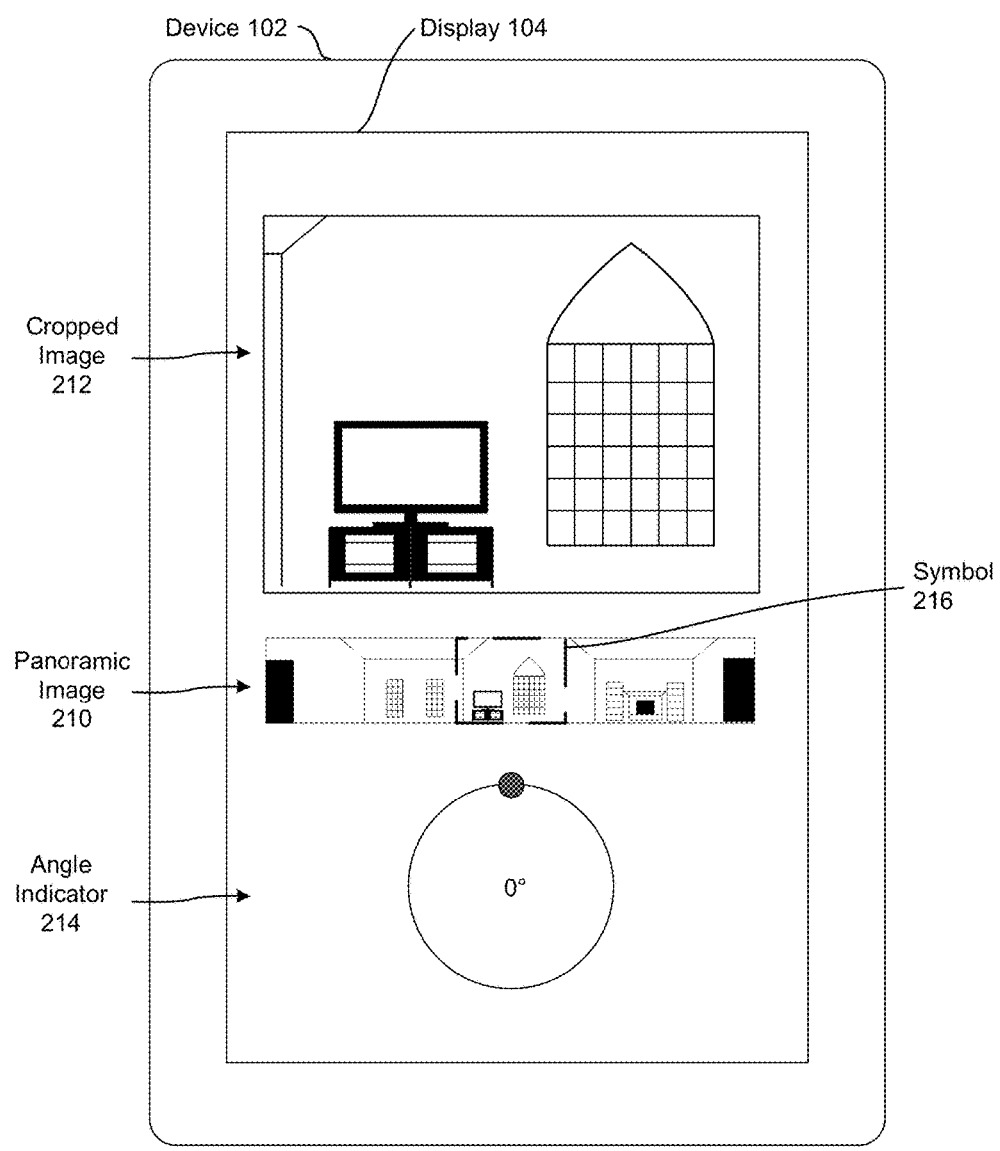

FIG. 2B illustrates an example of a user interface including an angle indicator according to embodiments of the present disclosure. As illustrated in FIG. 2B, the device 102 may display the cropped image 212, the panoramic image 210 and an angle indicator 214 on the display 104. The angle indicator may be a visual representation of the angle of view relative to the reference location. The angle indicator 214 may indicate to a user 10 of the device 102 that the cropped image 212 only displays a portion of the overall panoramic image 210 and the position of the cropped image 212 within the panoramic image 210. In addition, a symbol 216 may indicate to the user 10 the portion of the panoramic image 212 included in the cropped image 212. Using the user interface illustrated in FIG. 2B, the user 10 may instruct the device 102 to shift from displaying a first direction (e.g., 0 degrees) in the cropped image 212 to displaying a second direction (e.g., 90 degrees) in the cropped image 212. As a result, the cropped image 212 would be updated to display the second direction, the symbol 216 would be moved within the panoramic image 210 and the angle indicator 214 would change to illustrate the angle associated with the second direction (e.g., 90 degrees).

Figure 3:
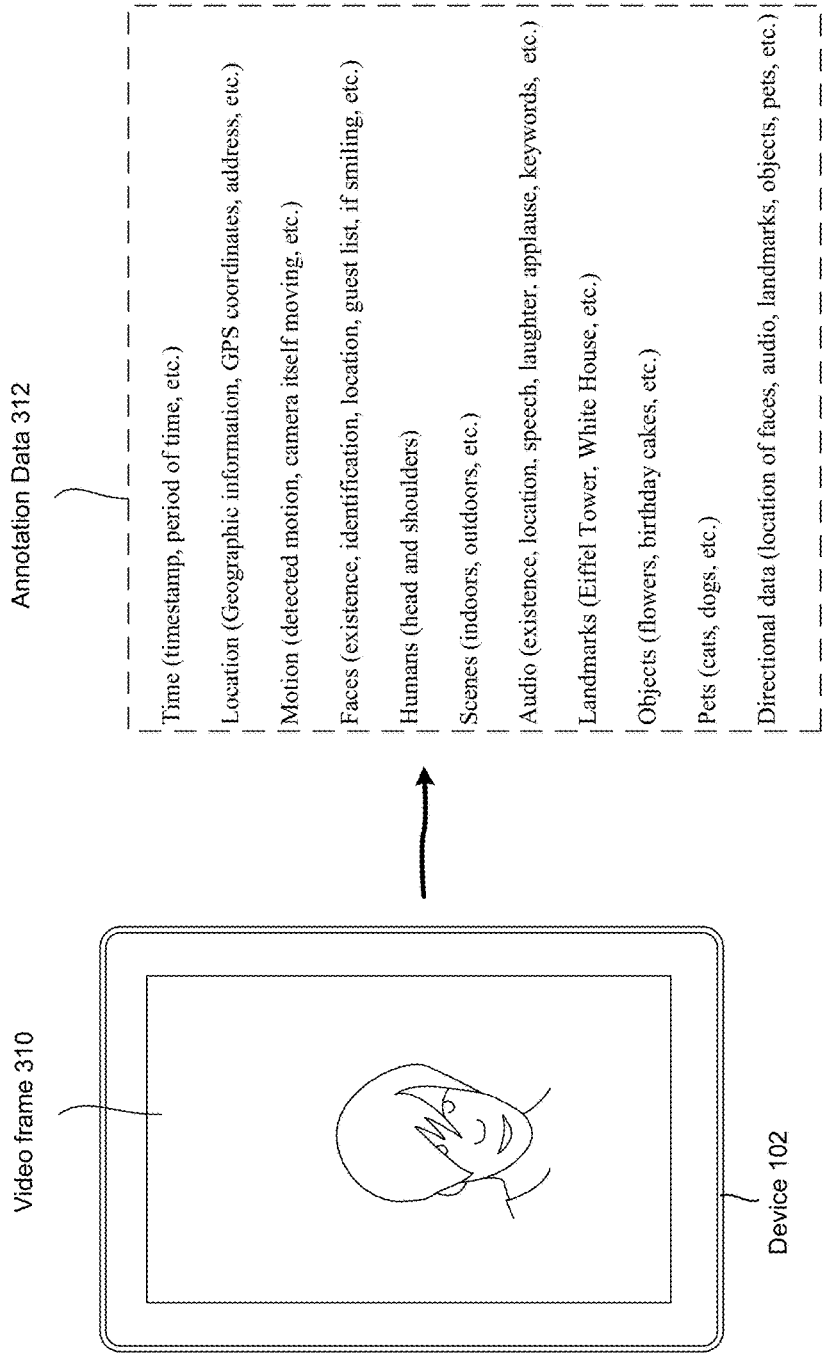
FIG. 3 illustrates an example of annotation data according to embodiments of the present disclosure.

FIG. 3 illustrates an example of types of annotation data according to embodiments of the present disclosure. The annotation data may be generated prior to step 122 of FIG. 1 by the server(s) 112 and/or another device. For example, the server(s) 112 may analyze a video frame 310 and generate annotation data 312, which may include time (e.g., a timestamp, a period of time, etc.), a location (e.g., geographic information, GPS coordinates, an address, etc.), motion data (detected motion, camera itself moving, etc.), faces (existence, identification, if smiling, etc.), humans (e.g., head and shoulders), scenes (e.g., indoors, outdoors, outdoor in car, outdoor in nature, outdoor near water, outdoor at sporting event, indoors at concert, indoors at party, etc.), audio (e.g., existence, direction, speech, laughter, applause, keywords, etc.), landmarks (e.g., Eiffel Tower, White House, etc.), objects (flowers, birthday cakes, etc.), pets (e.g., cats, dogs, etc.) and/or directional data (e.g., position of faces, audio, landmarks, objects, pets, etc. within the video frame). In some examples, the annotation data may indicate an area within (e.g., x and y pixel coordinates) the video data that is of interest. For example, the image capture device 110 may capture video data including a first portion (e.g., a stage of a concert or the like) and a second portion (e.g., a back wall opposite the stage), and the annotation data may indicate the area associated with the first portion. Using the annotation data, the server(s) 112 may emphasize the first portion and omit the second portion.

In addition to the annotation data illustrated in FIG. 3, the server(s) 112 may generate additional annotation data. For example, the server(s) 112 may generate emotional data, which may include emotional detection (e.g., determining a mood such as happy, sad, excited, etc.) for an individual, a group of people, the video frame 310 or a combination thereof. As another example, the server(s) 112 may determine if a concert or other event is represented in the video frame 310 and may match the geographic location to the event. For example, the server(s) 112 may determine venues in proximity to the geographic location, events scheduled for the venues and determine if one of the events is represented in the video data. In some examples, the server(s) 112 may detect indications of an event (e.g., detecting a crowd, an amphitheater, a concert hall or the like) and may compare the geographic information to venues in proximity as a result of detecting the indications.

In some examples, the server(s) 112 may perform speech recognition on speech detected in audio associated with the video data to generate output text and may embed the output text in the annotation data. As a first example, the server(s) 112 may include output text corresponding to all of the speech detected in the audio, such as a transcription of a conversation or the like. As a second example, the server(s) 112 may analyze the output text and include a portion of the output text corresponding to key phrases. For example, the server(s) 112 may recognize "Happy Birthday" or a particular name in the output text and include the recognized phrase in associated annotation data.

Figure 4:
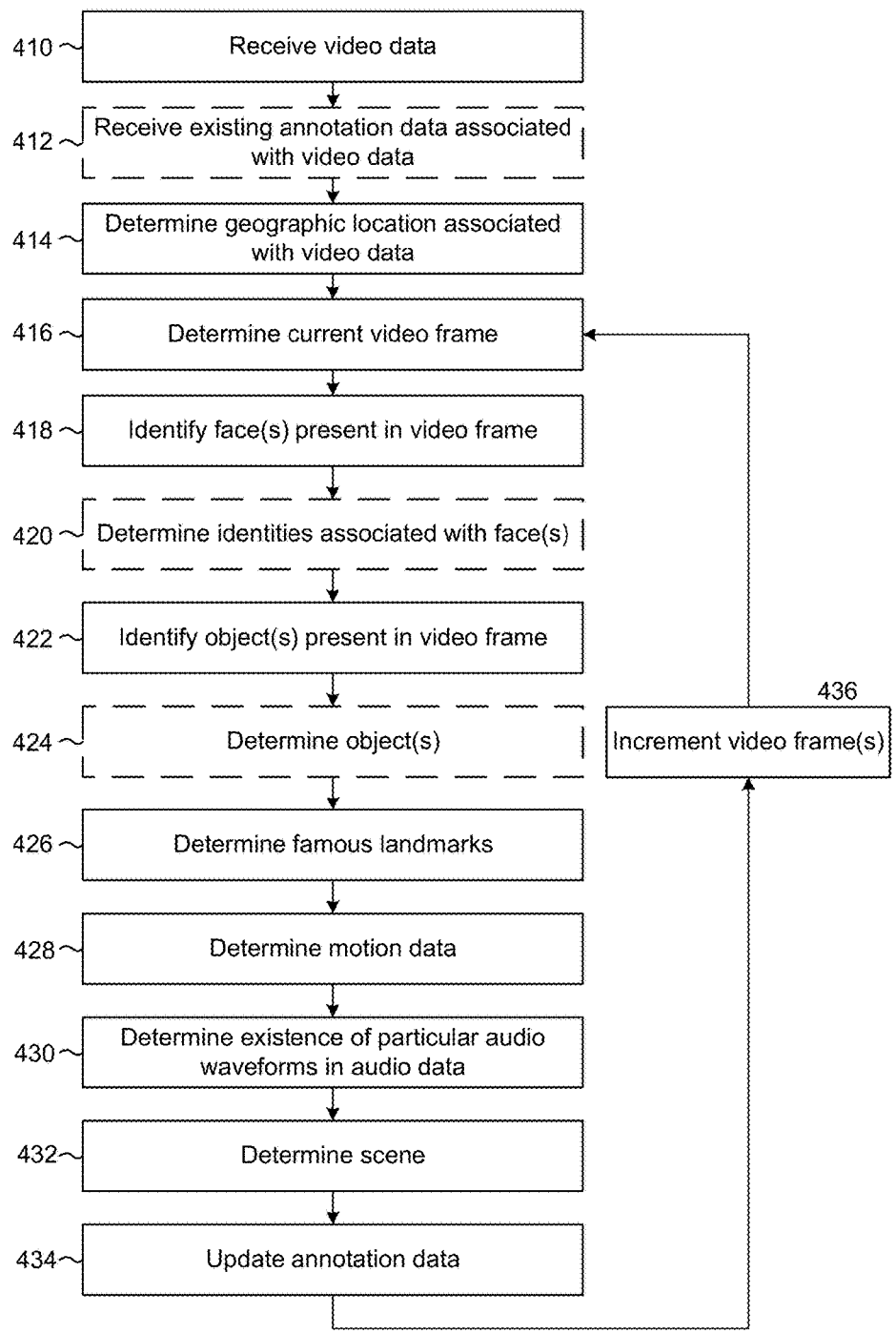
FIG. 4 is a flowchart conceptually illustrating an example method for generating annotation data according to embodiments of the present disclosure.

FIG. 4 is a flowchart conceptually illustrating an example method for generating annotation data according to embodiments of the present disclosure. As discussed above, the annotation data may be generated by the server(s) 112 or a remote device prior to receiving the annotation data in step 122. For example, the server(s) 112 may generate annotation data upon receiving individual video clips, upon receiving video data or upon receiving a request for a video summarization. For ease of explanation, some of the steps illustrated in FIG. 4 are explicitly depicted as optional, indicated by dashed lines. However, any of the steps illustrated in FIG. 4 may be omitted without departing from the present disclosure. In addition, while the following description refers to the steps illustrated in FIG. 4 being executed by the server(s) 112, some or all of the steps illustrated in FIG. 4 may be executed by the device 102, the image capture device 110, the server(s) 112, a remote device or any combination thereof.

As illustrated in FIG. 4, the server(s) 112 may receive (410) video data and may optionally receive (412) existing annotation data associated with the video data. The server(s) 112 may receive the video data from a remote device (e.g., the device 102, the image capture device 110, a second server(s) 112 or the like) or by accessing the video data on the server(s) 112. The existing annotation data may have been determined by any of the device 102, the image capture device 110, the server(s) 112 and/or a remote device prior to the system receiving the video data in step 410. While video data may include multiple video clips, the video data illustrated in FIG. 4 refers to video data associated with a single video clip (e.g., a video clip captured from a beginning time to an ending time). The server(s) 112 may determine (414) a geographic location associated with the video data, such as a Global Positioning System (GPS) coordinates associated with where the video data was captured. However, the geographic location is not limited to the GPS coordinates and the server(s) 112 may determine a geographic location based on the GPS coordinates. If the video data is captured while in motion (e.g., in a plane, a car or other vehicle), the geographic location may be associated with the beginning time or the ending time of the video data.

The server(s) 112 may determine (416) a current video frame and may identify (418) face(s) present in the video frame. For example, the server(s) 112 may analyze the video frame and identify the face(s) based on facial recognition, identifying head and shoulders, identifying eyes, smile recognition or the like. Optionally, the server(s) 112 may determine (420) identities associated with the face(s). For example, the server(s) 112 may employ facial recognition and a database of identities, such as social networking database, to determine the identities. In some examples, the video data will be tagged with identities of faces represented in the video data. Thus, the server(s) 112 may determine the identity of a face in a video frame from a list of identities associated with the video data.

The server(s) 112 may identify (422) object(s) present in the video frame. For example, the server(s) 112 may identify object(s) such as physical objects (e.g., flowers, toys, clothing or the like), animals (e.g., pets such as cats, dogs, wildlife or the like), vehicles (e.g., cars, airplanes, or the like) or the like. Optionally, the server(s) 112 may determine (424) object(s), which may include determining a type of object, a brand of the object, a name for the object or the like. Thus, whereas step 422 identifies an existence of the object in the video frame, step 424 identifies an identity of the object or otherwise recognizes what the object is. The server(s) 112 may determine (426) famous landmarks (e.g., Big Ben, a famous cathedral, monument or the like) represented in the video frame based on the geographic location. For example, the geographic location may be in proximity to a monument and the server(s) 112 may identify the monument within the video frame.

The server(s) 112 may determine (428) motion data, including motion data associated with the image capture device (e.g., movement of the image capture device while capturing the video data) and objects represented in the video data (e.g., movement of an object relative to the image capture device). The server(s) 112 may determine (430) an existence of particular audio waveforms in audio data associated with the video data. For example, the server(s) 112 may identify an existence of speech, laughter, applause or the like. In some examples, as discussed in greater detail below with regard to FIG. 9, the server(s) 112 may identify music in the audio data. The server(s) 112 may determine (432) a scene associated with the video frame. For example, the server(s) 112 may determine if the video frame was captured indoors or outdoors and may determine other characteristics that may be useful in determining a scene associated with the video frame. Finally, the server(s) 112 may update (434) the annotation data associated with the video frame and increment (436) video frame(s) (e.g., one video frame, several video frames or the like) and repeat steps 416-434. For example, the server(s) 112 may increment video frames linearly to update annotation data for video frames in the video data by one or at a fixed increment.

Additionally or alternatively, the server(s) 112 may increment the video frame(s) nonlinearly to focus on annotating interesting frames, which may be determined based on a low resolution preview or other techniques. Thus, the server(s) 112 may determine an amount to increment each time step 436 is performed and the amount to increment may vary without departing from the present disclosure.

In addition to using annotation data to generate video summarizations, the server(s) 112 may use the annotation data for additional functionality. As a first example, the server(s) 112 may extract information about a user 10 from the annotation data and may use the extracted information to target advertisements to the user 10. As a second example, the server(s) 112 may collect annotation data from a plurality of users and/or video clips to collate information. Thus, the server(s) 112 may create a database of annotation data and may use the database to identify trends, brands or the like from video data from a variety of sources.

Figure 5B:

FIGS. 5A-5H illustrate examples of annotation data according to embodiments of the present disclosure. As illustrated in FIG. 5A, the server(s) 112 may store annotation data in an annotation database 510. The annotation database 510 may include the annotation data discussed above (e.g., time, location, motion, faces, humans, scenes, audio, landmarks, objects, pets, directional data, etc.) for individual video frames. As illustrated in FIG. 5A, the annotation database 510 includes Frame 1, Frame 2, Frame 3, Frame 10, Frame 11, Frame 30 and Frame 35, although the annotation database 510 may include any number of video frames and is not limited to the example illustrated in FIG. 5A. In some examples, the annotation database 510 may include an entry for individual video frames included in video data (e.g., every video frame has an entry). In other examples, the annotation database 510 may include an entry every fixed number of video frames (e.g., 5th, 10th, 15th etc.). In some examples, the annotation database 510 may include an entry whenever the annotation data changes (e.g., annotation data is associated with intervening video frames until a following entry in the annotation database 510). Additionally or alternatively, the annotation database 510 may include an entry for select video frames without departing from the present disclosure. For example, the server(s) 112 may determine a priority metric (discussed below) for individual video frames and store the annotation data associated with individual video frames having a priority metric exceeding a threshold. Other techniques for storing annotation data may also be used.

The server(s) 112 may determine the priority metric (e.g., interesting score) using the annotation data. For example, the server(s) 112 may use an algorithm or other technique to calculate the priority metric based on objects included in the video frame or other characteristics of the video frame. The priority metric may be used to generate video clips and/or to rank individual video frames. For example, the server(s) 112 may determine first video frames associated with priority metrics exceeding a threshold and may group first video frames in proximity to generate a video clip. As an example, the server(s) 112 may determine that Frames 1-11 are associated with priority metrics exceeding the threshold and may generate a video clip including Frames 1-11.

The annotation database 510 illustrated in FIG. 5A may include video frames for multiple clips included in the video data. However, the disclosure is not limited thereto and FIG. 5B illustrates an annotation database 512 for an individual video clip. As illustrated in FIG. 5B, the annotation database 512 includes Frame 1, Frame 2, Frame 3, Frame 10, Frame 11, Frame 30 and Summary Data associated with the overall video clip. The annotation database 512 includes a series of columns corresponding to annotation data that is included in the video clip and indicates whether the annotation data is represented in each video frame. For example, Face 1 is represented in Frame 1, Frame 2, Frame 3, Frame 10, Frame 11 and Frame 30, while Face 3 is only represented in Frame 11 and Frame 30. Thus, the annotation database 512 may indicate the annotation data associated with individual video frames.

The summary data may include statistics for the video clip that are unique to the particular video clip. For example, the summary data may include a frame selector statistic identifying transitions within the video clip (e.g., grouping the video frames based on a similarity index) or the like. Additionally or alternatively, the summary data may include video "fingerprints" that indicate characteristics of the video clip that may be used to identify similar video clips. For example, the characteristics of the video clip may include feature vectors, histograms of image data, gradients of the image data, histograms of gradients, a signature of the image data or the like that may be used to determine if image data is similar between video clips.

While the annotation database 512 illustrated in FIG. 5B lists individual frames for the video clip, video frames may be grouped together as illustrated in the annotation database 514 illustrated in FIG. 5C. For example, the annotation database 514 groups Frames 1-200, Frames 350-600, Frames 800-1200, Frames 1500-1650 and Frames 2000-2200, Frames 2400-2550. The annotation database 514 may group the video frames based on annotation data and/or the frame selector statistic for the overall video clip.

FIG. 5D illustrates a Master Clip Table (MCT) 520 that includes Clips 1-7. The MCT 520 may indicate which frames are associated with a video clip (e.g., Clip 1 may be associated with Frames 1-450, which corresponds to a 15 second video clip at 30 frames per second), a priority metric associated with the video clip, summary data (as discussed above with regard to FIG. 5B) associated with the video clip and/or a time/position of interesting moments within the video clip (e.g., pixel coordinates associated with individual timestamps corresponding to the moment).

In some examples, the user 10 may generate a video clip, which may be included in the MCT 520 with or without annotation data. The server(s) 112 may annotate the user-generated video clip, although the present disclosure is not limited thereto. A moment may be a bounding box around an interesting object or section of the video clip over time. Additional data may be included about a moment, such as a per-frame interest rating, a position of a detected face, an identity of a detected face or the like.

The server(s) 112 may generate the MCT 520 based on priority metrics determined from the annotation data. The server(s) 112 may determine a priority metric associated with each video frame in the video data, with individual video frames (e.g., selected video frames based on content represented in the selected video frames), with groups of video frames (e.g., tracks or moments) and/or with video clips. For example, the server(s) 112 may determine first priority metrics associated with individual video frames to determine interesting portions of the video data. Using the annotation data, the server(s) 112 may identify transitions within the video data (e.g., tracks), may group interesting video frames based on the transitions to determine moments and may determine second priority metrics associated with individual moments. The server(s) 112 may then extract video clips including interesting moments and may determine third priority metrics associated with individual video clips. Thus, the server(s) 112 may identify the most interesting video frames, may identify moments including the most interesting video frames and may generate video clips including the most interesting moments. The server(s) 112 may compare the priority metrics to each other (e.g., relative priority metrics) or to a global threshold (e.g., absolute priority metrics) to generate the MCT 520.

In some examples, the MCT 520 may include every video clip included in the video data (e.g., the video data is segmented into sequential video clips, each of which is included in the MCT 520), but the disclosure is not limited thereto and the MCT 520 may include only a portion of the video clips (e.g., interesting video clips associated with a portion of the video data). While the MCT 520 illustrated in FIG. 5D includes video clips associated with a single sequential stream of video data (e.g., video captured at one time), the disclosure is not limited thereto. Instead, a MCT 522 may include video clips associated with multiple streams of video data (e.g., video captured at more than one time, such as separate recordings) as illustrated in FIG. 5E. As illustrated in FIG. 5E, the MCT 522 includes Clips 1-4 captured at a first time (e.g., capture date of Sep. 15, 2015) and Clips 50-52 captured at a second time (e.g., capture data of Sep. 24, 2015). Additionally or alternatively, the MCT 522 may include video clips from separate recordings on the same date (e.g., first video recording at one point on Sep. 15, 2015, second video recording at a later point on Sep. 15, 2015) and/or video clips captured by multiple image capture devices 110 without departing from the disclosure.

Figure 5F:

FIG. 5F illustrates a detection results database 530. Instead of including individual rows for individual video frames or groups of video frames, the detection results database 530 includes individual rows for annotation data and indicates groups of video frames including the annotation data. For example, Face 1 may be associated with a first group of video frames (e.g., frames 1-150), a second group of video frames (e.g., frames 600-900), a third group of video frames (e.g., frames 1500-2000) etc. Thus, the detection results database 530 indicates individual sections of the video data associated with the annotation data. Additionally or alternatively, the detection results database 530 may indicate multiple groups of video frames in a single column without departing from the disclosure.

Figure 5G:

FIG. 5G illustrates a face database 540 including a list of unique faces represented in the video data and indicating which video clips are associated with each of the individual faces. The server(s) 112 may analyze individual video clips using facial recognition (e.g., a facial recognition engine or the like) using Face Feature Vectors (which includes information that characterizes the appearance of individual faces under various poses and/or illuminations), may identify unique faces within each of the video clips, and may determine if the same face is detected in multiple video clips. For example, Face 1 is represented in Clip 1, Clip 2 and Clip 5 but not represented in Clip 3 and Clip 4. The server(s) 112 may include one or more images associated with individual faces (stored in the Face Feature Vector), or may access a database with images of individual faces in different poses. In some examples, an identity of an individual face may be determined (e.g., based on user input or using facial recognition processing) and stored in the face database 540. In some examples, a first unique face represented in first video clips may be associated with a second unique face represented in second video clips and the information may be combined in the face database 540. For example, a user 10 may be identified as a first unique face (e.g., Face 1 represented in Clips 1, 2 and 5) and a second unique face (e.g., Face 4 represented in Clip 3). Using identity information, user input, updated facial recognition processing or additional video data, the server(s) 112 may determine that the first unique face and the second unique face are associated with the user 10 and may merge Face 1 and Face 4. Thus, the face database 540 may be updated over time based on subsequent processing. While FIG. 5G illustrates the face database 540 indicating video clips associated with individual faces, the disclosure is not limited thereto and the face database 540 may indicate video frames associated with the individual faces without departing from the disclosure.

FIG. 5H illustrates an example of a video clip annotated with two moments, which are tracked over the course of the video clip. As illustrated in FIG. 5H, a video clip 530 may be 10 seconds long and may include a field of view of 360 degrees. In a first video frame (e.g., Frame 1), a first person 11-1 is at a first position and a second person 11-2 is at a second position. As the video clip progresses, the first person 11-1 travels in a first direction towards the second position and the second person 11-2 travels in a second direction towards the first position. The first person 11-1 and the second person 11-2 meet in a third video frame (e.g., Frame 3) and, remaining in proximity to each other, both move in the first direction (e.g., Frame 5 and Frame 6). The server(s) 112 may annotate the video clip 530 with two moments, a first moment 532-1 associated with the first person 11-1 (e.g., bounding box surrounding the first person 11-1) and a second moment 532-2 associated with the second person 11-2 (e.g., bounding box surrounding the second person 11-2). In some examples, the server(s) 112 may annotate the video clip 530 with a third moment indicating positions and/or video frames where the first person 11-1 and the second person 11-2 are in proximity. For example, the third moment may be a bounding box including the first person 11-1 and the second person 11-2 in Frames 3-6.

The server(s) 112 may select video clips from the video data based on priority metrics. As an illustrative example, the server(s) 112 may generate priority metric graphs representing the individual priority metrics and may select a video clip from the video data corresponding to a peak in the priority metric graph. FIG. 6 illustrates examples of priority metric graphs according to embodiments of the present disclosure. As illustrated in FIG. 6, the video data 610 extends from a begin time (e.g., 0 seconds) to an end time (e.g., 30 seconds). The video data 610 may correspond to a video segment (e.g., video segment including multiple video clips) and/or a video clip. Using annotation data associated with the video data 610 (or generating the annotation data from the video segment and/or video clip itself), the server(s) 112 may generate a first priority metric graph 620-1 and/or a second priority metric graph 620-2. For example, the server(s) 112 may retrieve existing priority metrics stored in the annotation data and/or may generate the priority metrics using the annotation data.

As illustrated in FIG. 6, a first priority metric graph 620-1 is illustrated as a bar graph including individual bars corresponding to individual priority metric values. A priority metric value may be associated with a single video frame or a series of video frames, in which case the bars included in the first priority metric graph 620-1 may be determined using quantization. For example, the server(s) 112 may segment the video frames and determine individual priority metric values corresponding to individual segments, reducing a computational load and/or smoothing the first priority metric graph 620-1. A second priority metric graph 620-2 is illustrated as a line chart based on the individual priority metric values, which may also be associated with a single video frame or a series of video frames. The second priority metric graph 620-2 may indicate raw priority metric values or may be a mathematical function (e.g., line of best fit) determined based on the raw priority metric values, for example to smooth the data. While FIG. 6 illustrates the priority metric graphs 620 using a bar chart and a line chart, the present disclosure is not limited thereto and the server(s) 112 may generate the priority metric graphs 620 using any techniques known to one of skill in the art without departing from the disclosure. Additionally or alternatively, the server(s) 112 may determine peaks from individual priority metric values associated with the video data 610 without generating a priority metric graph 620 without departing from the disclosure.

The priority metric graphs 620 indicate a priority metric value associated with individual video frames included in the video data 610. For example, the priority metric graphs 620 may include a priority metric value corresponding to each video frame included in the video data 610, an average of every n video frames (where n is a natural number), a sampling every n video frames, and/or a variable sampling (e.g., based on motion data, changes to the annotation data or the like), although the present disclosure may vary. As illustrated in priority metric graphs 620, the priority metric values vary over time, with relative peaks (e.g., the 2 second mark, the 6 second mark, the 12 second mark, the 18 second mark, the 22 second mark, 26 second mark and the 30 second mark) and intervening valleys.

The server(s) 112 may identify the relative peaks using mathematical techniques known to one of skill in the art. In some examples, the server(s) 112 may determine a threshold to identify relative peaks that are interesting (e.g., highest peaks, above average peaks or the like). For example, the server(s) 112 may calculate a threshold (e.g., a horizontal line associated with a fixed priority metric value) and determine relative peaks exceeding the threshold. The server(s) 112 may calculate the threshold as a global threshold (e.g., universal threshold for multiple video segments/video clips included in the video data), a local threshold (e.g., individual threshold associated with a single video segment/video clip) or a variable threshold (e.g., variable threshold based on the average priority metric value within a range (e.g., time window). For example, the server(s) 112 may determine a fixed threshold (not shown) for the video data 610 and may determine the relative peaks exceeding the fixed threshold (e.g., the 6 second mark, the 12 second mark, 26 second mark and the 30 second mark). Thus, the server(s) 112 may identify four moments of interest in the video data 610 and may generate one or more video snippets from the moments of interest.

In some examples, the priority metric graphs 620 may not be as smooth as the examples illustrated in FIG. 6 and the server(s) 112 may need to identify spikes in the priority metric graphs 620. A spike in the priority metric graph 620 may indicate a series of video frames that are interesting relative to neighboring video frames, corresponding to a brief moment of interest that may be extracted as a video snippet. For example, in some examples a peak in the priority metric graph 620 may correspond to an interesting moment but may extend for a relatively long period of time (e.g., 4+ seconds), which may be difficult to extract as a video snippet (e.g., the interesting aspect of the peak extends over time and truncating the peak to generate a video snippet removes proper context). In contrast, a short peak (e.g., spike) may extend for a relatively short period of time (e.g., 1-2 seconds) and may retain context as a video snippet. To identify spikes in the priority metric graph 620, the server(s) 112 may use a variable threshold. Thus, instead of using a fixed threshold associated with the video data 610 from 0 seconds to 30 seconds, the server(s) 112 may divide the video data 610 into multiple sections and determine individual thresholds associated with each section. For example, the server(s) 112 may divide the video data 610 into fixed sections based on time (e.g., from 0 seconds to 10 seconds, 10 seconds to 20 seconds, etc.), multiple variable sections based on peaks (e.g., from first peak to second peak, from second peak to third peak, etc.), multiple variable sections including portions of the valleys (e.g., beginning of first valley to end of first valley, beginning of second valley to end of second valley, etc.) or the like. Additionally or alternatively, the server(s) 112 may determine the threshold using a running average (e.g., average priority metric values over 5 seconds) or the like to determine where the priority metric graph 620 spikes relative to surrounding video frames.

Figure 7A:
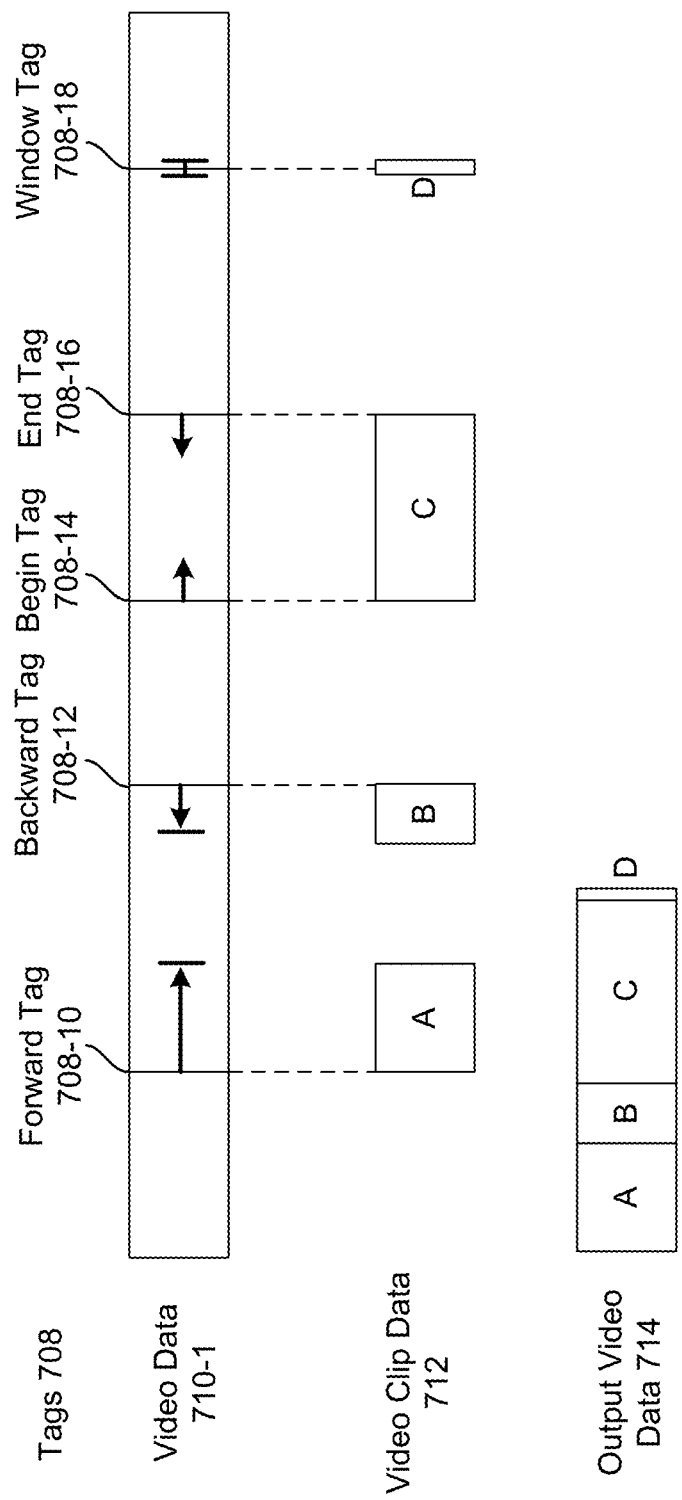

FIGS. 7A-7C illustrate examples of generating video summarizations according to embodiments of the present disclosure. As illustrated in FIG. 7A, tags 708 may be associated with specific moments within first video data 710-1, and the server(s) 112 may use the tags 708 to determine video clip data 712 associated with each of the tags 708. The server(s) 112 may then generate output video data 714 including at least portions of the video clip data 712.

To illustrate examples of different tags, FIG. 7A illustrates a forward tag 708-10, a backward tag 708-12, a begin tag 708-14, an end tag 708-16 and a window tag 708-18. The forward tag 708-10 is associated with a forward looking command, such as when the server(s) 112 determines that there is a moment of interest in the near future. The video clip data 712-A associated with the forward tag 708-10 may extend between a beginpoint, such as a timestamp associated with the forward tag 708-10, and an endpoint subsequent to the beginpoint. The server(s) 112 may determine the endpoint based on the theme, the annotation data, user preferences and/or user input associated with the forward tag 708-10. For example, the server(s) 112 may determine the endpoint based on annotation data, a priority metric included in the annotation data falling below a threshold, a fixed duration of time for all forward tags, a variable duration of time specified by the forward tag 708-10, an audio energy level of audio data associated with the first video data 710-1 falling below a threshold, when no movement is detected in the first video data 710-1 for a duration of time or the like. Thus, the forward tag 708-10 may begin at a first moment in time and may extend until a second moment in time. The period between the first moment in time and the second moment in time may be preconfigured (for example, 30 seconds) and/or may be adjustable.

The backward tag 708-12 is associated with a backward command, such as when the server(s) 112 identifies that a moment of interest recently occurred. The video clip data 712-B associated with the backward tag 708-12 may extend between a beginpoint, prior to a timestamp associated with the backward tag 708-12, and an endpoint subsequent to the timestamp. The server(s) 112 may determine the beginpoint based on the theme, the annotation data, user preferences and/or user input associated with the backward tag 708-12. For example, the server(s) 112 may determine the beginpoint based on annotation data, a priority metric included in the annotation data exceeding a threshold, a fixed duration of time for all backward tags, a variable duration of time specified by the backward tag 708-12, an audio energy level falling below a threshold immediately prior to the timestamp associated with the backward tag 708-12, when no movement was detected in the first video data 710-1 for a duration of time immediately prior to the timestamp associated with the backward tag 708-12 or the like. Similarly, the server(s) 112 may determine the endpoint as discussed above or using the timestamp associated with the backward tag 708-12. Thus, the backward tag 708-12 may begin at a first moment in time prior to when the backward tag 708-12 was received and may extend until a second moment in time, such as when the backward tag 708-12 was received. The period between the first moment in time and the second moment in time may be preconfigured (for example, 30 seconds) and/or may be adjustable.

The begin tag 708-14 and the end tag 708-16 are associated with a start/stop command, respectively, such as when the server(s) 112 identifies a beginning and an end of a moment of interest. The video clip data 712-C may extend between a beginpoint associated with the begin tag 708-14 and an endpoint associated with the end tag 708-16. While the beginpoint is associated with the begin tag 708-14, the beginpoint is not limited to a timestamp associated with the begin tag 708-14. Instead, the server(s) 112 may determine the beginpoint as discussed above, with the begin tag 708-14 being used as a rough estimate of the beginpoint. Similarly, the endpoint is not limited to a timestamp associated with the end tag 708-16. Instead, the server(s) 112 may determine the endpoint as discussed above, with the end tag 708-16 being used as a rough estimate of the endpoint.

The window tag 708-18 is associated with a window command, such as when the server(s) 112 wants to capture a number of images surrounding a particular moment in time. For example, the server(s) 112 may select a number of images before a timestamp of the command and the same number of images after the timestamp of the command to create a window of video clip data 712-D, centered on the timestamp. Alternatively, the window tag/command may be of a "snapshot" variety, where the window comprises just a single image, where the single image is associated with the timestamp of the command. Thus, the video clip data 712-D may be a single frame or image shown for a duration of time. The single frame may be captured based on the window tag 708-18, such as the timestamp associated with the window tag 708-18, although the present disclosure is not limited thereto. The server(s) 112 may determine the duration of time based on the theme, annotation data, user preferences and/or user input. While FIG. 7A illustrates several examples of tags 708, the disclosure is not limited thereto and the tags 708 may vary. In addition, the server(s) 112 may receive multiple tags 708 of each type and/or tags 708 from multiple users without departing from the disclosure.

To illustrate that the video summarization may include video clips captured on different dates and/or from different image capture devices 110, FIG. 7B illustrates second video data 710-2 including a first portion captured on a first date (e.g., Sep. 15, 2015) and a second portion captured on a second date (e.g., Sep. 24, 2015). The server(s) 112 may generate the video clip data 712 from the second video data 710-2 and may generate the output video data 714 using the video clip data 712.

In some examples, the server(s) 112 may determine candidate video clips and may select a portion of the candidate video clips to include in a video summarization based on similarities between the candidate video clips. Thus, the server(s) 112 may improve a diversity across video clips and avoid having similar video clips included in the video summarization. As illustrated in FIG. 7C, the server(s)

112 may determine candidate video clip data 722 (e.g., video clips A-G) from video data 720 based on annotation data, for example using priority metrics associated with individual video clips. The server(s) 112 may then compare the candidate video clip data 722 using a similarity matrix to identify similar content (e.g., video clips having high affinity with respect to certain attributes/characteristics). For example, the server(s) 112 may determine if two video clips are similar in terms of color characteristics, number of faces, motion data, etc., which may be indicated by the similarity matrix (e.g., a two dimensional array indicating a similarity between the two video clips).

As illustrated in FIG. 7C, the server(s) 112 may group similar video clips as Group 1 (e.g., video clips A-C), Group 2 (e.g., video clips D-E) and Group 3 (e.g., video clips F-G). To improve a diversity across video clips, the server(s) 112 may select a single video clip from each group. In some examples, the server(s) 112 may select the video clip from each group having the highest priority metric for the group. For example, the server(s) 112 may determine selected video clip data 724 including video clip A from Group 1, video clip E from Group 2 and video clip F from Group 3. Therefore, the output video data 726 may include video clips A, E and F.

In some examples, multiple video clips from a first group may have priority metrics exceeding video clips from a second group. For example, video clips A, B and C in Group 1 may each have a priority metric higher than priority metrics associated with video clips D and E in Group 2. When the server(s) 112 selects the selected video clip data 724 using priority metrics alone, the output video data 726 may include video clips A, B and C. However, when the server(s) 112 selects the selected video clip data 724 using priority metrics and similarity matrices, the output video data 726 may exclude video clips B and C due to their similarity to video clip A, despite video clips B and C having higher priority metrics than video clips D and E.

Figure 8:
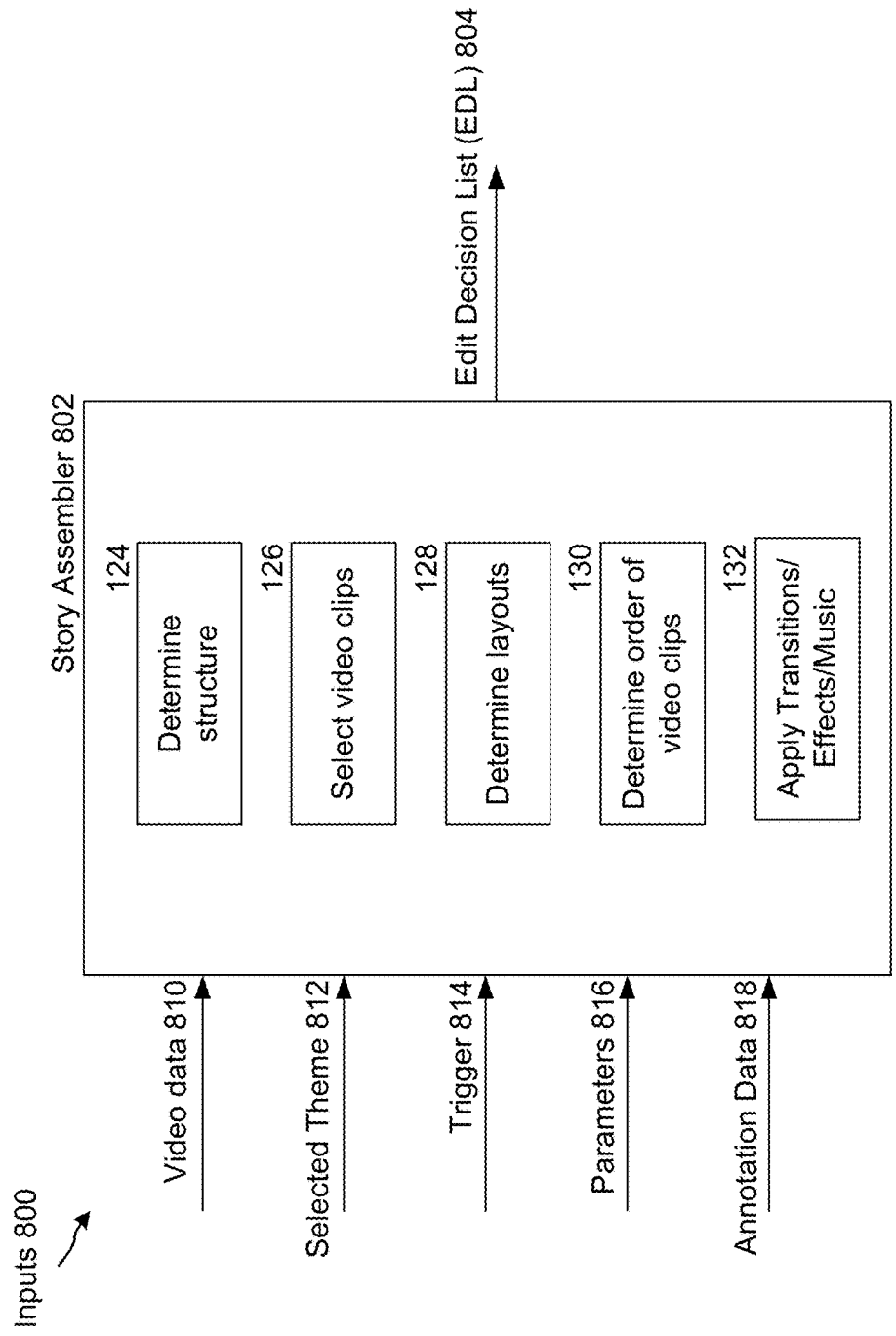
FIG. 8 illustrates an example of story assembly according to embodiments of the present disclosure.

FIG. 8 illustrates an example of story assembly according to embodiments of the present disclosure. As illustrated in FIG. 8, inputs 800 may be input to a story assembler 802 and the story assembler 802 may generate an Edit Decision List (EDL) 804 based on the inputs 800.

The inputs 800 may include video data 810, a selected theme 812, a video summarization trigger 814, parameters 816 and annotation data 818. However, the disclosure is not limited thereto and the inputs 800 may include additional inputs not illustrated in FIG. 8.

The video data 810 may include a plurality of video clips or other video data, which may include an aspect ratio greater than 2:1. The selected theme 812 may be determined for the video summarization and may indicate structures, layouts, transitions, special effects and/or music to apply to the video summarization. The trigger 814 may be a command or request that triggered generation of the video summarization and the story assembler 802 may tailor the video summarization based on the trigger 814. For example, the video summarization may be triggered by a user request or command, a summary of video data uploaded or captured at a single time, an event, a holiday, a year in review or the like. Based on the trigger 814, the story assembler XX02 may select different structure, video clips, sequence, layouts, transitions, special effects or music for the video summarization.

The parameters 816 may include desired parameters such as characteristics in the annotation data that may be emphasized in the video summarization. For example, the parameters 816 may specify a particular person, object, scene or the like represented in the video data to be included in the video summarization. In some examples, the parameters 816 may be input by a user 10, for example as part of the trigger 814 when the trigger 814 is a command or request input by the user 10. In other examples, the parameters 816 may be determined from the trigger 814, for example for a year in review for a particular user or for an event like a birthday. As an example of parameters 816, the user 10 may request a story created using video data including select people over a period of time, such as Person A and Person B over the last three months.

The annotation data 818 may indicate subjects included in the video data or other characteristics of the video data (hereinafter, subjects and characteristics may be jointly referred to as "characteristics"), such as specific identities, people, faces, objects, pets, locations, landmarks, scenes, etc. represented in the video data or motion data, scene data, audio information, time data, directional data, etc. corresponding to the video data. In some examples, the annotation data may include an annotation database listing individual video frames and associated characteristics, a master clip table listing individual video clips and associated characteristics and/or video tag(s) indicating characteristics corresponding to specific video frame(s).

Figure 12:
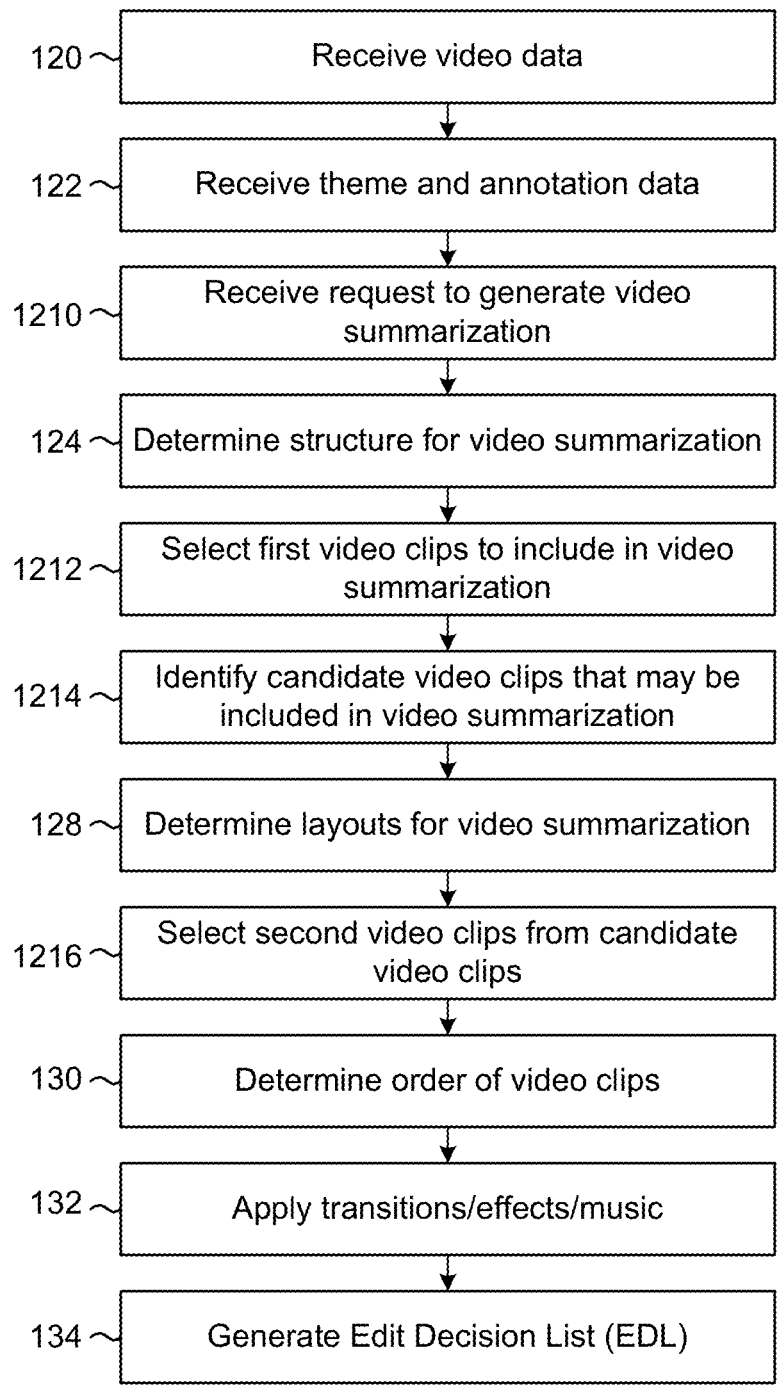
FIG. 12 is a flowchart conceptually illustrating an example method for generating a video summarization according to embodiments of the present disclosure.

The story assembler 802 may determine (124) a structure for the video summarization, select (126) video clips, determine (128) layouts, determine (130) an order of video clips and apply (132) transitions, special effects and/or music to the video clips to generate the EDL 804, as discussed in greater detail above with regard to FIG. 1 and below with regard to FIG. 12.

The EDL 804 may include rendering information used to render the video summarization, such as a location of each video clip and pixel coordinates of the video clip in a video frame of the video summarization, as discussed above with regard to FIG. 1.

Figure 9:
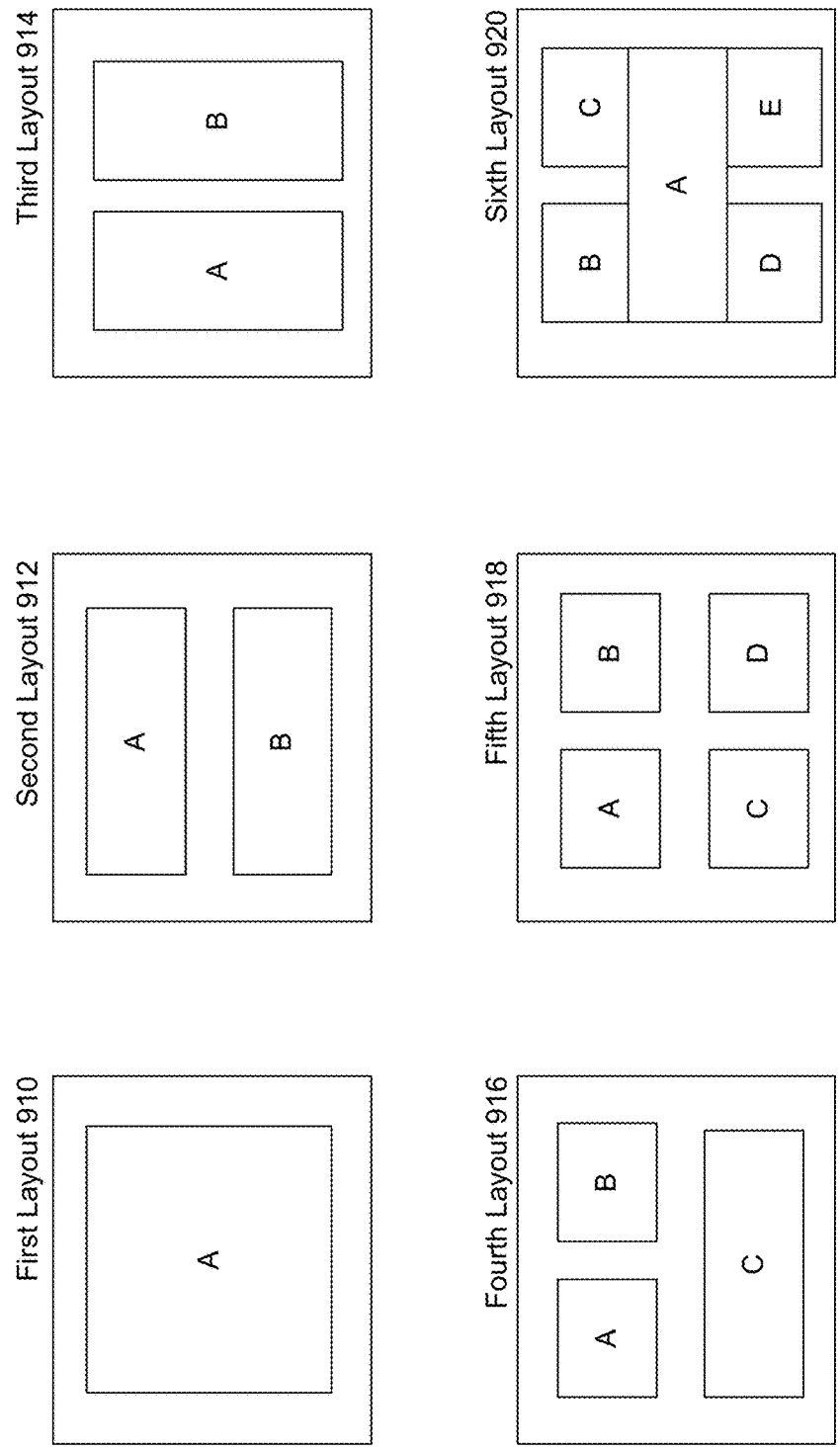
FIG. 9 illustrates examples of layouts according to embodiments of the present disclosure.

FIG. 9 illustrates examples of layouts according to embodiments of the present disclosure. For example, a first layout 910 includes a single video clip, which may cover an entirety of a video frame of the video summarization, although the disclosure is not limited thereto and the video clip may only cover a portion of the video frame. In contrast to a single video clip, a second layout 912 and a third layout 914 may include two video clips, either in a top and bottom configuration (e.g., second layout 912) or a left and right configuration (e.g., third layout 914). In addition to the second layout 912 and/or the third layout 914 illustrated in FIG. 9, the server(s) 112 may generate other layouts including two video clips in different configurations, for example with one video clip overlapping the other video clip.

A layout may include three video clips, as illustrated by fourth layout 916, which has a first video clip A and a second video clip B above a third video clip C. However, this is only provided as an example of a layout including three video clips and the disclosure is not limited thereto. Similarly, while FIG. 9 illustrates a fifth layout 918 including four video clips and a sixth layout 920 including five video clips, the disclosure is not limited thereto and may include any number of video clips in any configuration.

The server(s) 112 may determine layouts associated with each video clip included in the video summarization. For example, the server(s) 112 may select a first layout including a single video clip for a first time (e.g., from 0 seconds to 15 seconds), may select a second layout including two video clips for a second time (e.g., from 15 seconds to 25 seconds), may select a third layout including a single video clip for a third time (e.g., from 25 seconds to 35 seconds) and may select a fourth layout including four video clips for a fourth time (e.g., from 35 seconds to 50 seconds). Thus, the server(s) 112 may select multiple different layouts at different times within the video summarization.

FIG. 10 illustrates an example of story assembly associated with video clips of a birthday celebration according to embodiments of the present disclosure. For example, the server(s) 112 may receive video data including video clips representing the birthday celebration and the server(s) 112 may identify objects included in the video clips, such as a birthday cake, candles, gifts or the like. Based on the identified objects, the server(s) 112 may determine a structure of the video summarization to emphasize the birthday celebration and the birthday celebrant. Thus, the server(s) 112 may select a structure including an opening shot, a body including multiple video clips and a closing shot. The server(s) 112 may then select candidate video clips using the structure and may determine layouts associated with different portions of the video summarization. For example, the opening shot may have a layout including a single video clip, while the body may have various layouts including multiple video clips. The server(s) 112 may then select video clips to include from the candidate video clips and determine an order of the selected video clips using the structure and the layouts. For example, the server(s) 112 may select video clips for the opening that emphasize preparations for the birthday celebration and guests arriving, may select video clips for the body that emphasize the birthday celebration, including some video clips emphasizing guests and other video clips emphasizing the environment, and may select video clips for the closing shot that emphasize blowing out candles on the birthday cake and opening gifts. FIG. 10 illustrates video data 1010 having a series of video frames 1012 that show a birthday celebrant receiving a cake and blowing out candles, which might be included in a layout with only a single video clip at the end of the video summarization. For example, the output video data 1020 is shown as having four video segments (A-D) and the video data 1010 is included in the fourth video segment D.

After selecting the video clips to include and determining an order of the selected video clips, the server(s) 112 may apply transitions between video clips, apply special effects to some or all of the video clips and may synchronize the video clips to audio data including music tracks. The server(s) 112 may generate an Edit Decision List (EDL) including sufficient information to render the video summarization using the selected video clips, the determined order of the video clips, the layouts and any transitions, special effects or music associated with the selected video clips. The EDL may be saved to re-render the video summarization at a later point in time or to modify the video summarization based on input. For example, the server(s) 112 may render the video summarization and display the video summarization to a user 10. Based on input received from the user 10, the server(s) 112 may modify portions of the EDL and generate a modified EDL. For example, the server(s) 112 may select additional video clips to include, may remove a selected video clip, may re-order the selected video clips, may modify layouts, may select or modify special effects, transitions or music or the like. Using the modified EDL, the server(s) 112 may render a second video summarization that is tailored based on the input from the user 10.

FIGS. 11A-11C illustrate examples of ordering video clips according to embodiments of the present disclosure. As illustrated in FIGS. 11A-11C, the server(s) 112 may receive video data 1110/1120/1130 (e.g., video clips A-D), may generate video clip data 1112/1122/1132 (e.g., video clips a-d) from the video data 1110/1120/1130 and may generate combined clip data 1114/1124/1134 including the video clip data 1112. However, the server(s) 112 may generate the video clip data 1112/1122/1132 and determine an order of the combined clip data 1114/1124/1134 using different techniques. For example, FIG. 11A illustrates generating the video clip data 1112 having similar characteristics, FIG. 11B illustrates generating the video clip data 1122 having different characteristics and FIG. 11C illustrates ordering the combined video clip data 1134 to separate similar characteristics.

For ease of explanation, FIGS. 11A-11C illustrate the video data 1110/1120/1130 having up to three distinct characteristics. However, the present disclosure is not limited thereto and the video data may have more than three characteristics and/or portions of the video data may be associated with multiple characteristics. Additionally or alternatively, the video data may have a variety of characteristics and the server(s) 112 may determine similarities and differences based on the multiple characteristics instead of individual characteristics. For example, the server(s) 112 may use the annotation data to identify multiple characteristics in common between each of the video data 1110/1120/1130.

As illustrated in FIG. 11A, the server(s) 112 may identify characteristics (e.g., Characteristic 1 and Characteristic 2) associated with video data 1110 and may select video clip data 1112 to include similar characteristics. For example, the server(s) 112 may associate portions of the video data 1110 with Characteristic 1 (e.g., first portions of video segments A and D and second portions of video segments B and C that include mostly environment/objects/textural shots) or Characteristic 2 (e.g., first portions of video segments B and C and second portions of video segments A and D that include mostly people). In the example illustrated in FIG. 11A, the server(s) 112 may select the video clip data 1112 to be similar (e.g., associated with the same characteristic), for example to generate the combined clip data 1114 with a common characteristic between the video clips (e.g., emphasizing people). Thus, the server(s) 112 may select portions of the video data 1110 associated with the same characteristic (e.g., Characteristic 2). For example, the server(s) 112 may select video clips a-d from the portions of video segments A-D associated with Characteristic 2. Therefore, combined clip data 1114 may include a common characteristic for included video clips.

As illustrated in FIG. 11B, the server(s) 112 may identify characteristics (e.g., Characteristic 1 and Characteristic 2) associated with video data 1120 and may select video clip data 1122 to include a mixture of characteristics. For example, the server(s) 112 may associate portions of the video data 1120 with Characteristic 1 (e.g., first portions of video segments A and D and second portions of video segments B and C that include mostly environment/objects/ textural shots) or Characteristic 2 (e.g., first portions of video segments B and C and second portions of video segments A and D that include mostly people). In the example illustrated in FIG. 11B, the server(s) 112 may select the video clip data 1122 to be different (e.g., having a variety of characteristics), for example to generate the combined clip data 1124 with visible differences between the video clips. Thus, the server(s) 112 may select portions of the video data 1120 having different characteristics to avoid identical characteristics between neighboring video clips. For example, the server(s) 112 may select video clips a and c from the portions of video segments A and C associated with Characteristic 2 and video clips b and d from the portions of video segments B and D associated with Characteristic 1. Therefore, combined clip data 1124 may alternate between Characteristic 1 and Characteristic 2 (e.g., alternating clips emphasizing people with clips emphasizing environment/objects/textural shots).

As illustrated in FIG. 11C, the server(s) 112 may identify characteristics (e.g., Characteristic 1, Characteristic 2 and Characteristic 3) associated with video data 1130, may select video clip data 1132 without regard to the characteristics (e.g., selecting the most interesting portions of the video data 1130 based on a priority metric) and may order the video clips within the combined clip data 1134 to alternate characteristics. For example, the server(s) 112 may associate portions of the video data 1120 with Characteristic 1 (e.g., first portions of video segments A and D and a second portion of video segment B that include mostly environment/textural shots), Characteristic 2 (e.g., first portions of video segments B and C and second portions of video segments A and D that include mostly people) or Characteristic 3 (e.g., second portion of video segment C that includes mostly objects). In the example illustrated in FIG. 11C, the server(s) 112 may select the video clip data 1132 without regard to the associated characteristics but may reorder the video clips based on the characteristics. For example, the server(s) 112 may select video clips a and b associated with Characteristic 1, video clip c associated with Characteristic 3 and video clip d associated with Characteristic 2. To separate video clips a and b (which are both associated with Characteristic 1), the server(s) 112 may reorder the video clips to insert video clips c and d between video clips a and b. Alternatively, the server(s) 112 may insert either of video clips c or d between video clips a and b without departing from the disclosure. Therefore, combined clip data 1134 may alternate between characteristics (e.g., Characteristic 1, Characteristic 3, Characteristic 2, Characteristic 1) to include visible differences between the video clips.

In some examples, the sever(s) 112 may add variety to the video summarization after selecting most interesting video clips (e.g., video clips having a highest priority metric) to anchor the video summarization. FIG. 12 is a flowchart conceptually illustrating an example method for generating a video summarization according to embodiments of the present disclosure. As illustrated in FIG. 12, the server(s) 112 may receive (120) video data and receive (122) a theme and annotation data as discussed above with regard to FIG. 1. The server(s) 112 may receive (1210) a request to generate a video summarization, which may be caused by a user request or command, a summary of video data uploaded or captured at a single time, an event, a holiday, a year in review or the like. Based on the request, the server(s) 112 may tailor the video summarization. For example, a video summarization triggered based on an event, holiday, year in review or other similar requests may be associated with a particular theme, structure, layouts, special effects, transitions or music.

The server(s) 112 may determine (124) a structure for the video summarization. The server(s) 112 may select (1212) first video clips to include in the video summarization, identify (1214) candidate video clips that may be included in the video summarization, determine (128) layouts for the video summarization and select (1216) second video clips from the candidate video clips. For example, the server(s) 112 may determine clip priority metrics for video clips included in the video data and may select the first video clips having a clip priority metric above a threshold. As discussed above, the clip priority metrics may be stored in the annotation data or the server(s) 112 may determine weighted priority metrics based on weighted characteristics. Thus, the first video clips may be the most interesting video clips and are always included in the video summarization. The candidate video clips may have a clip priority metric below the first threshold but above a second threshold, indicating that the candidate video clips are somewhat interesting and may be included in the video summarization. The server(s) 112 may determine the layouts based on the first video clips and the candidate video clips and may identify a position in the layouts and/or video summarization for the first video clips. The server(s) 112 may then select a portion of the candidate video clips to include in the video summarization to provide context to the first video clips. In some examples, the server(s) 112 may select from the candidate video clips based on similarity scores and/or diversity scores to add variety to the video summarization. For example, the second video clips may be environmental or textural shots that provide context for character shots included in the first video clips.

The server(s) 112 may determine (130) an order of the video clips, apply (132) transitions or special effects to some or all of the video clips and synchronize music with the video clips and may generate (134) an edit decision list (EDL) used to render the video summarization.

Figure 13A:
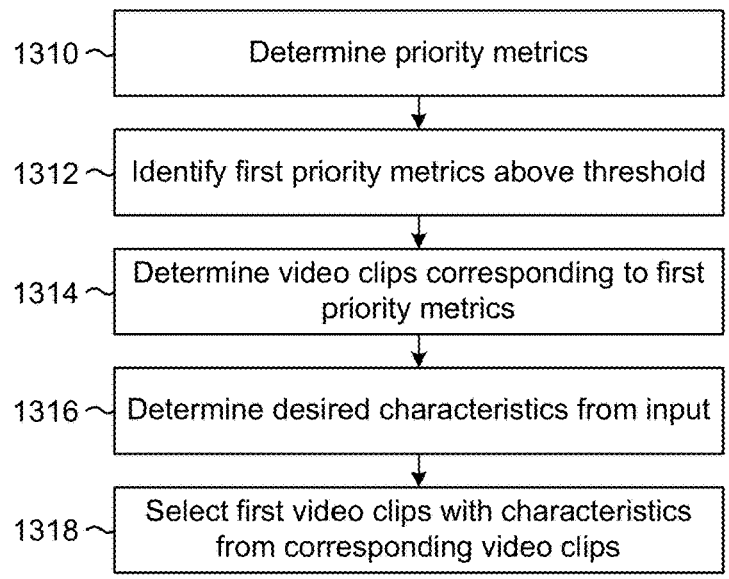
FIGS. 13A-13B are flowcharts conceptually illustrating example methods for selecting video clips according to embodiments of the present disclosure.
Figure 13B:
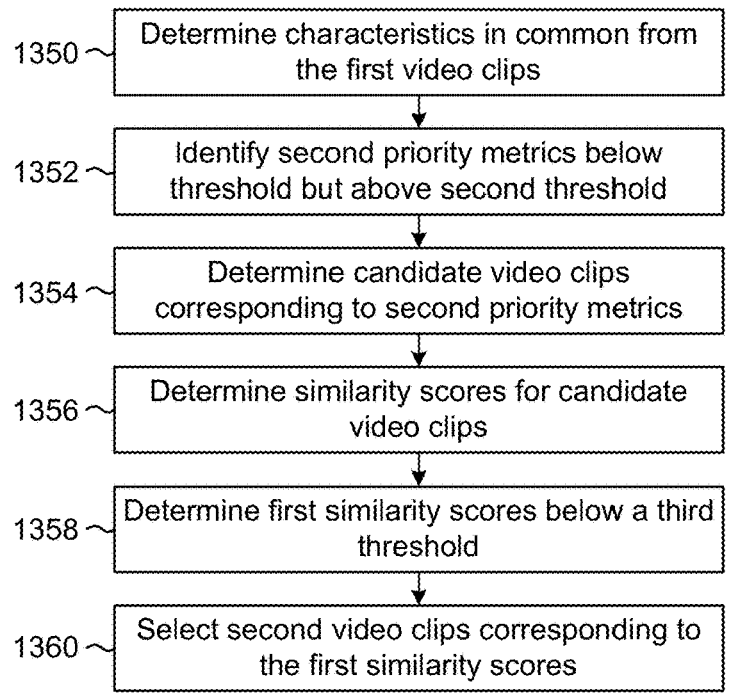

FIGS. 13A-13B are flowcharts conceptually illustrating example methods for selecting video clips according to embodiments of the present disclosure. As illustrated in FIG. 13A, the server(s) 112 may determine (1310) priority metrics for individual video clips, identify (1312) first priority metrics above a threshold and determine (1314) video clips corresponding to the first priority metrics. The server(s) 112 may determine (1316) desired characteristics from input and may select (1318) first video clips with characteristics from the video clips corresponding to the first priority metrics. The desired characteristics may be input along with a request to generate the video summarization and may include individual faces, objects or other characteristics to emphasize in the video summarization. For example, the desired characteristic may identify the birthday celebrant or important people and the server(s) 112 may select the first video clips from the video clips corresponding to the first priority metrics that include the birthday celebrant or important people.

As illustrated in FIG. 13B, the server(s) 112 may determine (1350) characteristics in common from the first video clips using the annotation data, may identify (1352) second priority metrics below the threshold but above a second threshold and may determine (1354) candidate video clips corresponding to the second priority metrics. Thus, the server(s) 112 may identify potential video clips to include in the video summarization that are interesting but don't need to be included. The server(s) 112 may determine (1356) similarity scores for individual candidate video clips, determine (1358) first similarity scores below a third threshold and select (1360) second video clips corresponding to the first similarity scores. Thus, the server(s) 112 may select the second video clips that are interesting but dissimilar to the first video clips to add a variety to the video summarization. The server(s) 112 may select only a portion of the candidate video clips as the second video clips based on a number of video clips needed in the structure/layouts chosen by the server(s) 112 and/or how well the candidate video clips fit the video summarization.

Figure 14:
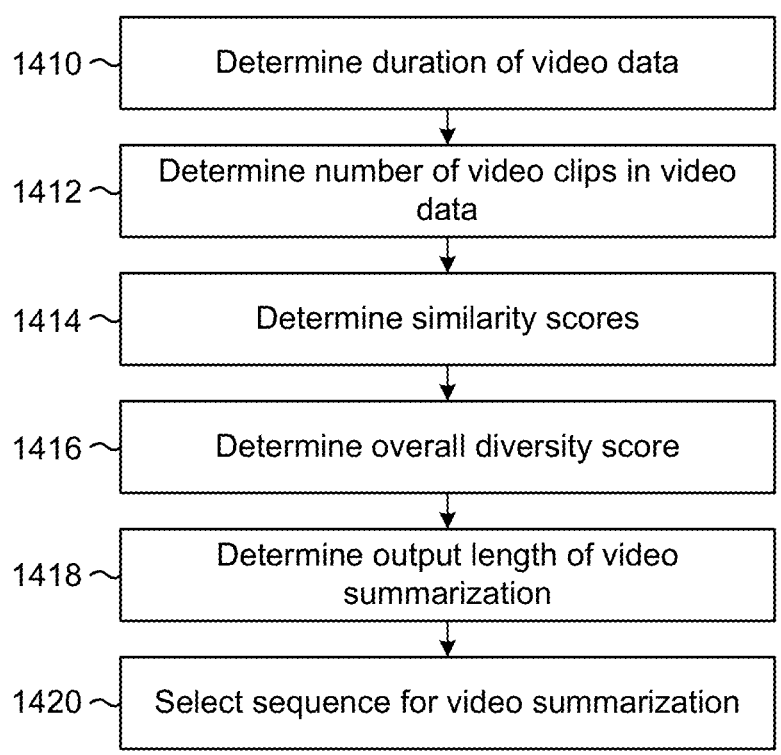
FIG. 14 is a flowchart conceptually illustrating an example method for determining a structure according to embodiments of the present disclosure.

The server(s) 112 may determine the structure based on the video data and/or annotation data. FIG. 14 is a flowchart conceptually illustrating an example method for determining a structure according to embodiments of the present disclosure. As illustrated in FIG. 14, the server(s) 112 may determine (1410) a duration (e.g., overall length of time) of video data and determine (1412) a number of video clips included in the video data (e.g., number of discrete video clips). The server(s) 112 may determine (1414) similarity scores for individual video clips (or between video clips) and may determine (1416) an overall diversity score for the video data. The server(s) 112 may determine (1418) an output length of the video summarization and select (1420) a sequence for the video summarization. For example, the server(s) 112 may generate a relatively short video summarization for video data with static or redundant information (e.g., few unique video clips) over a long duration or may generate a relatively long video summarization for video data with dynamic information (e.g., many unique video clips) over a short duration.

Figure 15:
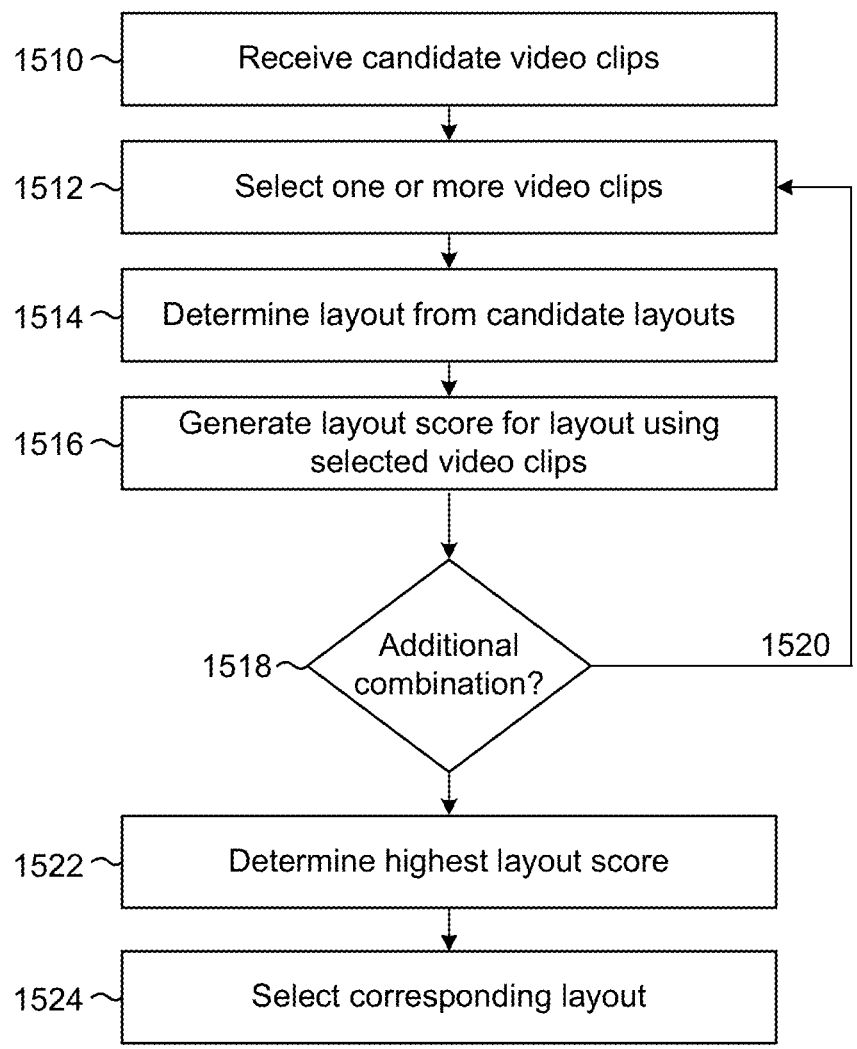
FIG. 15 is a flowchart conceptually illustrating an example method for selecting a layout according to embodiments of the present disclosure.

In some examples, the server(s) 112 may determine an individual layout to include in the video summarization by generating multiple layouts including a variety of combinations of candidate video clips, generating a layout score for each of the multiple layouts and selecting the layout having the highest layout score. FIG. 15 is a flowchart conceptually illustrating an example method for selecting a layout according to embodiments of the present disclosure. As illustrated in FIG. 15, the server(s) 112 may receive (1510) candidate video clips, may select (1512) one or more video clips to include in a layout, may determine (1514) a layout from candidate layouts and may generate (1516) a layout score for the layout using the selected video clips. The server(s) 112 may determine (1518) if there is an additional combination of the candidate video clips and if so, may loop (1520) to step 1512 to repeat steps 1512-1518. If there are no additional combinations, the server(s) 112 may determine (1522) a highest layout score and select (1524) a corresponding layout.

For example, the server(s) 112 may have 10 candidate video clips and may generate layouts associated with every combination of one or more of the 10 candidate video clips. Thus, the server(s) 112 may generate a first layout for the first video clip, a second layout for the second video clip, a third layout for both the first video clip and the second video clip and so on until the server(s) 112 has generated every possible combination. The server(s) 112 may then generate a layout score for each of the layouts and select the layout having the highest layout score.

In some examples, the server(s) 112 may determine the layout to increase a layout diversity between sequential layouts. For example, the server(s) 112 may determine that a first layout and a third layout include a single video clip and may select a second layout that includes two or more video clips. Therefore, the server(s) 112 may vary a number of video clips being displayed at a time.

In some examples, the server(s) 112 may determine the layout score based on framing associated with the video clips. For example, a first video clip may have a landscape (e.g., wide) orientation and the server(s) 112 may increase a layout score of a wide layout (e.g., two video clips side by side above a third video clip) that corresponds to the first video clip. Similarly, a second video clip may have a portrait (e.g., tall) orientation and the server(s) 112 may increase a layout score of a tall layout (e.g., two video clips top and bottom next to a third video clip) that corresponds to the second video clip. Additionally or alternatively, the server(s) 112 may favor layouts that include related video clips at the same time. For example, if the first video clip and the second video clip are related, the server(s) 112 may increase a layout score of a layout that includes two or more video clips so that the first video clip and the second video clip may be displayed simultaneously.

Figure 16:
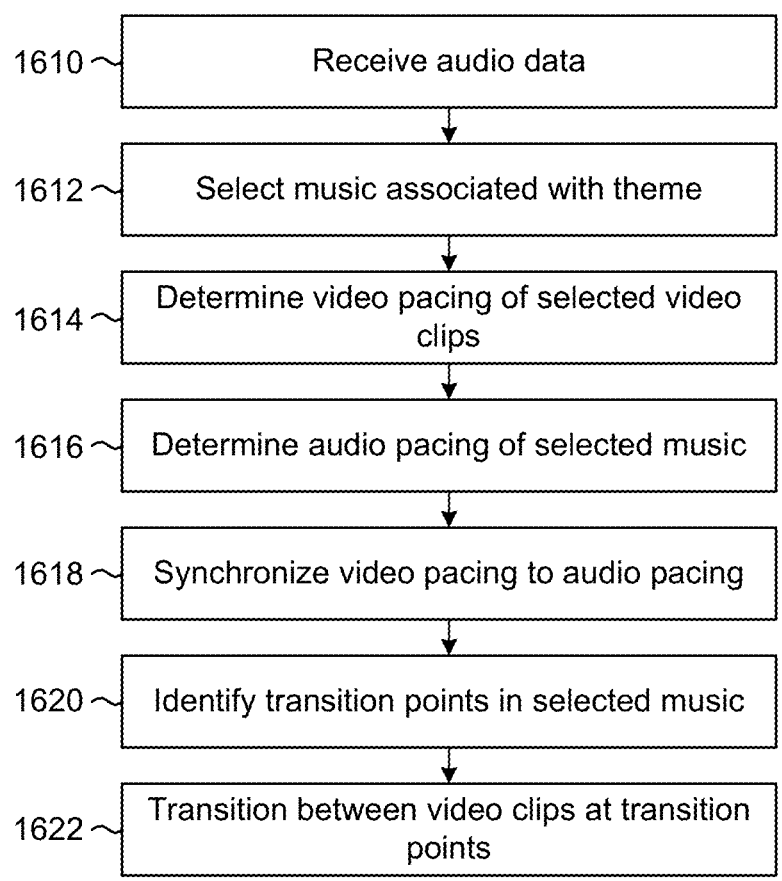
FIG. 16 is a flowchart conceptually illustrating an example method for according to embodiments of the present disclosure.

FIG. 16 is a flowchart conceptually illustrating an example method for selecting and synchronizing music according to embodiments of the present disclosure. As illustrated in FIG. 16, the server(s) 112 may receive (1610) audio data and may select (1612) music associated with a theme, such as particular music tracks. The server(s) 112 may determine (1614) a video pacing of selected video clips, determine (1616) audio pacing of selected music and may synchronize (1618) the video pacing to the audio pacing. For example, a fast music track may be selected but the server(s) 112 may advance video frames every two measures to match the video pacing to the audio pacing. The server(s) 112 may identify (1620) transition points in the selected music and may transition (1622) between video clips during the transition points. For example, a transition point may correspond to a particular moment in the music or a beat associated with the music, and the video summarization may transition from a first video clip to a second video clip at the transition point.

Individual music tracks may have a fixed length, although different tracks may have different fixed lengths. In some examples, the server(s) 112 may select a music track corresponding to a video clip based on the fixed length. For example, the server(s) 112 may determine a length associated with the video clip and may synchronize the video pacing to the audio pacing by selecting a music track having a similar length. Thus, if the video clip is one minute long, the server(s) 112 may determine ten music tracks that have a fixed length of about a minute and may select one of the ten music tracks to include in the video summarization. Additionally or alternatively, the server(s) 112 may detect a mood associated with a video clip and/or video summarization and may select music tracks having a pacing associated with the mood. For example, if the video clip includes fast motion, the server(s) 112 may associate the video clip with upbeat mood music, or if the video clip includes slow motion and a contrast is slow and moody, the server(s) 112 may associate the video clip with slower mood music.

Figure 17:
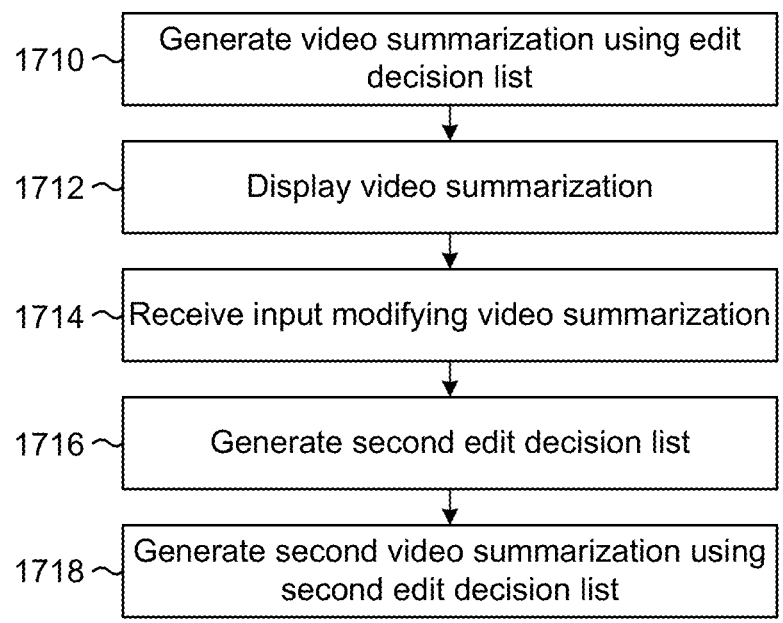
FIG. 17 is a flowchart conceptually illustrating an example method for selecting and synchronizing music according to embodiments of the present disclosure.

FIG. 17 is a flowchart conceptually illustrating an example method for generating a second edit decision list based on input according to embodiments of the present disclosure. As illustrated in FIG. 17, the server(s) 112 may generate (1710) a video summarization using an edit decision list and may display (1712) the video summarization. The server(s) 112 may receive (1714) an input modifying the video summarization, may generate (1716) a second edit decision list based on the input and may generate (1718) a second video summarization using the second edit decision list. For example, the server(s) 112 may select additional video clips to include, may remove a selected video clip, may re-order the selected video clips, may modify layouts, may select or modify special effects, transitions or music or the like. In some examples, the server(s) 112 may modify an amount of video data included in the output video data (e.g., change a beginning time and/or an ending time to increase or decrease a length of the output video data), to modify a portion of the video data included in the output video data (e.g., zoom or pan within the video data), shift a time window associated with a video clip (e.g., change a beginning time of a video clip without changing the time window), specify an object of interest, specify an event of interest, specify or modify an angle associated with the output video data, increase or decrease a panning speed or the like.

Figure 18:
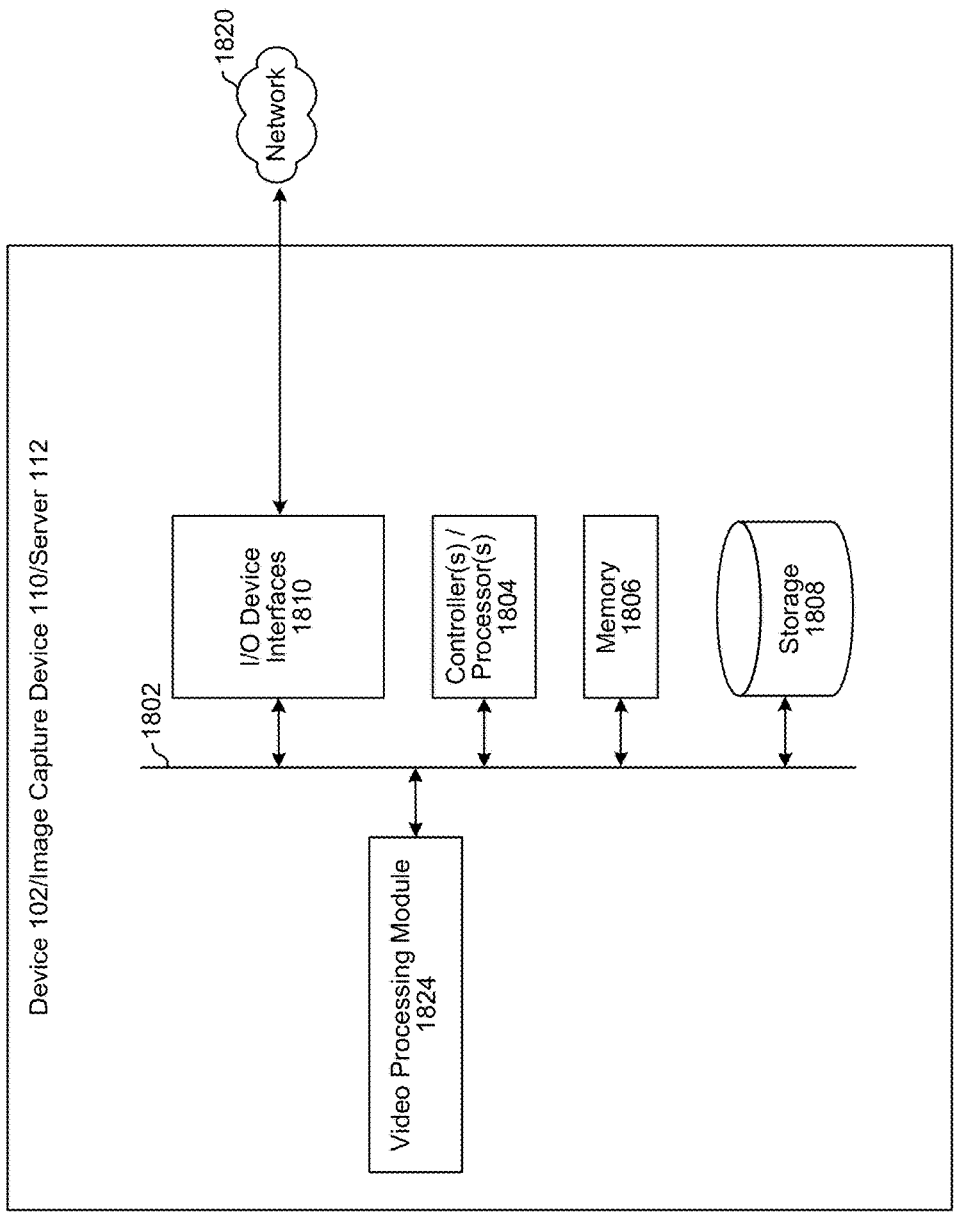
FIG. 18 is a block diagram conceptually illustrating example components of a system according to embodiments of the present disclosure.

FIG. 18 illustrates a block diagram conceptually illustrating example components of a system 100 including one or more of a device 102, an image capture device 110 and/or a server(s) 112. Depending upon how the system is structured, some of the components illustrated in FIG. 18 as part of the device 102, the image capture device 110 or the server(s) 112 may be included only in the device 102, the image capture device 110 or in the server(s) 112, or may be distributed across multiple devices 102, image capture devices 110 and/or servers 112. Other components not illustrated may also be included in the device 102, the image capture device 110 and/or the server(s) 112. In operation, the system 100 may include computer-readable and computer-executable instructions that reside in storage 1808 on the device 102/image capture device 110/server(s) 112. The device 102/image capture device 110/server(s) 112 may be an electronic device capable of performing video processing. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/image capture device 110/server(s) 112 may also be a component of any of the abovementioned devices or systems.

As illustrated in FIG. 18, the device 102/image capture device 110/server(s) 112 may include an address/data bus 1802 for conveying data among components of the device 102/image capture device 110/server(s) 112. Each component within the device 102/image capture device 110/server(s) 112 may also be directly connected to other components in addition to (or instead of) being connected to other components across the bus 1802.

The device 102/image capture device 110/server(s) 112 may include one or more controllers/processors 1804 comprising one-or-more central processing units (CPUs) for processing data and computer-readable instructions and a memory 1806 for storing data and instructions. The memory 1806 may include volatile random access memory (RAM), non-volatile read only memory (ROM), non-volatile magnetoresistive (MRAM) and/or other types of memory. The device 102/image capture device 110/server(s) 112 may also include a data storage component 1808 for storing data and processor-executable instructions. The data storage component 1808 may include one or more non-volatile storage types such as magnetic storage, optical storage, solid-state storage, etc. The device 102/image capture device 110/server(s) 112 may also be connected to a removable or external non-volatile memory and/or storage (such as a removable memory card, memory key drive, networked storage, etc.) through the input/output device interfaces 1810.

The device 102/image capture device 110/server(s) 112 includes input/output device interfaces 1810. A variety of components may be connected to the device 102/image capture device 110/server(s) 112 through the input/output device interfaces 1810, such as camera(s) 115 and microphone(s) 116. However, the disclosure is not limited thereto and the device 102/image capture device 110/server(s) 112 may not include an integrated camera or microphone. Thus, the camera(s) 115, microphone(s) 116 and/or other components may be integrated into the device 102/image capture device 110/server(s) 112 or may be separate without departing from the disclosure. In some examples, the image capture device 110 may include an inertial measurement unit (IMU), gyroscope, accelerometers or other component configured to provide motion data or the like associated with the image capture device 110.

The input/output device interfaces 1810 may be configured to operate with a network 1820, for example a wireless local area network (WLAN) (such as WiFi), Bluetooth, ZigBee and/or wireless networks, such as a Long Term Evolution (LTE) network, WiMAX network, 3G network, etc. The network 1820 may include a local or private network or may include a wide network such as the internet. Devices may be connected to the network 1820 through either wired or wireless connections.

The input/output device interfaces 1810 may also include an interface for an external peripheral device connection such as universal serial bus (USB), FireWire, Thunderbolt, Ethernet port or other connection protocol that may connect to networks 1820. The input/output device interfaces 1810 may also include a connection to an antenna (not shown) to connect one or more networks 1820 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/image capture device 110/server(s) 112 further includes a video processing module 1824, which may comprise processor-executable instructions stored in storage 1808 to be executed by controller(s)/processor(s) 1804 (e.g., software, firmware), hardware, or some combination thereof. For example, components of the video processing module 1824 may be part of a software application running in the foreground and/or background on the device 102/image capture device 110/server(s) 112. The video processing module 1824 may control the device 102/image capture device 110/server(s) 112 as discussed above, for example with regard to FIGS. 1, 12, 14A-14B, 13 and/or 15A-15B. Some or all of the controllers/modules of the video processing module 1824 may be executable instructions that may be embedded in hardware or firmware in addition to, or instead of, software. In one embodiment, the device 102/image capture device 110/server(s) 112 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/image capture device 110/server(s) 112 and its various components may be executed by the controller(s)/processor(s) 1804, using the memory 1806 as temporary "working" storage at runtime. The executable instructions may be stored in a non-transitory manner in non-volatile memory 1806, storage 1808, or an external device. Alternatively, some or all of the executable instructions may be embedded in hardware or firmware in addition to or instead of software.

The components of the device(s) 102/image capture device 110/server(s) 112, as illustrated in FIG. 18, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 19:
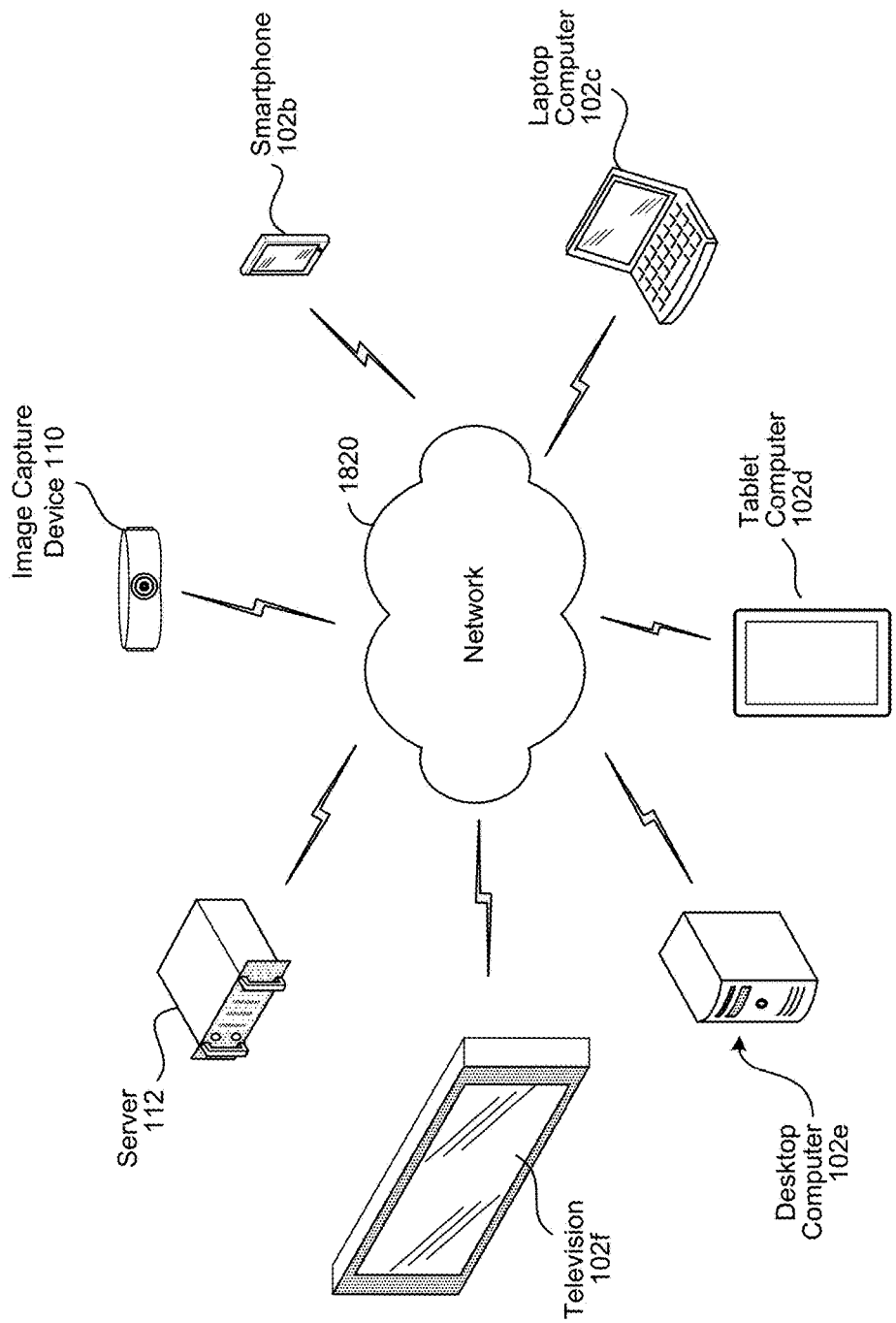
FIG. 19 illustrates an example of a computer network for use with the system.

As shown in FIG. 19, multiple devices may be connected over a network 1820. The network 1820 may include a local or private network or may include a wide network such as the internet. Devices may be connected to the network 1820 through either wired or wireless connections. For example, a smart phone 102b may be connected to the network 1820 through a wireless service provider. Other devices, such as an image capture device 110, laptop computer 102c, tablet computer 102d, desktop computer 102e, television 102f, and/or server(s) 112, may connect to the network 1820 through a wired connection. The server(s) 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server(s) 112 may perform any of the steps described above with regard to FIGS. 1, 12, 14A-14B, 13 and/or 15A-15B. Alternatively, the server(s) 112 may receive and store data generated by the image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server(s) 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for generating a video summarization from a corpus of video data, the method comprising:
   receiving first video data including a plurality of video clips having a first aspect ratio greater than 2:1;
   receiving a request to generate the video summarization using the first video data;
   receiving annotation data associated with the plurality of video clips, the annotation data indicating characteristic data associated with individual frames in the first video data;
   determining a theme to apply to the video summarization;
   determining a configuration for the video summarization including a pacing and a sequence, the pacing indicating a speed associated with the video summarization and the sequence indicating types of video clips to be included in the video summarization;
   determining a first characteristic in the characteristic data associated with the theme, the first characteristic indicating a number of faces represented in the first video data;
   receiving a second characteristic in the characteristic data associated with the theme, the second characteristic indicating an amount of movement represented in the first video data;
   determining a first weight associated with the first characteristic;
   determining a second weight associated with the second characteristic;

determining a first priority metric that corresponds to a first measure of interest in at least a portion of a first video clip of the plurality of video clips using the annotation data, the first weight and the second weight;
determining a second priority metric that corresponds to a second measure of interest in at least a portion of a second video clip of the plurality of video clips using the annotation data, the first weight and the second weight; and
determining a third priority metric that corresponds to a third measure of interest in at least a portion of a third video clip of the plurality of video clips using the annotation data, the first weight and the second weight.

2. The computer-implemented method of claim 1, further comprising:
determining that the first priority metric is above a first threshold;
selecting the first video clip;
determining that the second priority metric is above the first threshold;
selecting the second video clip;
determining that the third priority metric is above the first threshold;
selecting the third video clip;
determining a first layout for the video summarization, the first layout indicating that the first video clip and the second video clip are displayed simultaneously in the video summarization during a first period of time and also indicating respective pixel coordinates associated with the first video clip and the second video clip within a video frame of the video summarization;
determining an ordered list indicating that the first video clip is to begin playback in the video summarization before the third video clip; and
generating the video summarization using the ordered list and the respective pixel coordinates associated with the first video clip and the second video clip, the video summarization having a second aspect ratio less than 2:1.

3. The computer-implemented method of claim 1, further comprising:
determining first characteristic data associated with the first video clip, the second video clip and the third video clip, the first characteristic data corresponding to motion data and a visual composition;
determining, using the annotation data and the first characteristic data, a second weighted priority metric corresponding to a fourth measure of interest in at least a portion of a fourth video clip from the plurality of video clips;
determining that the second weighted priority metric is below a first threshold;
determining that the second weighted priority metric is above a second threshold lower than the first threshold;
determining, based on the first characteristic data, a first similarity score corresponding to a similarity between a portion of the fourth video clip and the first video clip;
determining that the first similarity score is below a third threshold;
selecting the fourth video clip; and
determining an ordered list to indicate that the fourth video clip is to begin playback in the video summarization after the first video clip and before the third video clip.

4. The computer-implemented method of claim 1, further comprising:
determining a duration associated with the first video data;
determining a number of video clips included in the first video data;
determining a first similarity score that corresponds to a first similarity between the first video clip and the second video clip;
determining a second similarity score that corresponds to a second similarity between the first video clip and the third video clip;
determining a third similarity score that corresponds to a third similarity between the second video clip and the third video clip;
determining an overall video diversity score indicating a diversity of video content included in the first video data; and
determining an output length for the video summarization.

5. A computer-implemented method, comprising:
receiving video data;
receiving annotation data associated with the video data;
receiving a theme identifier indicating a theme associated with a video summarization;
determining a configuration for the video summarization based on at least one of the annotation data and the theme identifier;
selecting a first video clip from the video data;
selecting a second video clip from the video data;
determining a first similarity score that corresponds to a first similarity between the first video clip and the second video clip;
determining an overall diversity score indicating a diversity of content included in the video data;
determining a first layout for the video summarization, the first layout indicating pixel coordinates associated with the first video clip within a video frame of the video summarization;
determining, based at least in part on the first similarity score and the overall diversity score, an output length for the video summarization; and
determining that the first video clip is to begin playback in the video summarization before playback of the second video clip.

6. The computer-implemented method of claim 5, further comprising:
determining a first priority metric that corresponds to interest in at least a portion of a third video clip;
determining that the first priority metric is above a first threshold; and
selecting the third video clip to include in the video summarization.

7. The computer-implemented method of claim 6, further comprising:
determining first characteristic data associated with the first video clip and the second video clip;
determining that the first priority metric is below a second threshold;
determining that the first priority metric is above a third threshold lower than the second threshold;
determining, based on the first characteristic data, a second similarity score that corresponds to a second similarity between a portion of the third video clip and the first video clip;
determining that the second similarity score is below a fourth threshold; and determining that the third video clip is to begin playback in the video summarization after playback of the first video clip and before playback of the second video clip.

8. The computer-implemented method of claim 5, further comprising:
receiving selected characteristic data associated with the video summarization;
determining, based on the annotation data and the selected characteristic data, a third priority metric that corresponds to interest in at least a portion of a third video clip;
determining that the third priority metric is above a threshold; and
selecting the third video clip to include in the video summarization.

9. The computer-implemented method of claim 5, further comprising:
determining a duration associated with the video data;
determining a number of video clips included in the video data;
determining a second similarity score that corresponds to a second similarity between the first video clip and a third video clip; and
determining a third similarity score that corresponds to a third similarity between the second video clip and the third video clip.

10. The computer-implemented method of claim 5, further comprising:
generating an edit decision list to render the video summarization, the edit decision list including the pixel coordinates associated with the first video clip and the second video clip within the video summarization;
generating the video summarization using the edit decision list;
displaying the video summarization;
receiving input modifying a portion of the video summarization;
generating a second edit decision list based on the input; and
generating a second video summarization using the second edit decision list.

11. The computer-implemented method of claim 5, further comprising:
receiving audio data including first music tracks and second music tracks;
selecting the first music tracks based on the theme identifier, the first music tracks including a first transition between a first music track and a second music track;
determining a first time associated with the first transition; and
transitioning between the first video clip and the second video clip at the first time.

12. A computer-implemented method comprising:
receiving video data;
receiving annotation data associated with the video data;
receiving a theme identifier indicating a theme associated with a video summarization;
determining a configuration for the video summarization based on at least one of the annotation data and the theme identifier;
selecting a first video clip from the video data;
selecting a second video clip from the video data;
determining a first layout for the video summarization, the first layout including the first video clip;
determining, based on the theme identifier, a first layout score associated with the first layout;

determining a second layout for the video summarization, the second layout including the first video clip;
determining, based on the theme identifier, a second layout score associated with the second layout;
determining that the first layout score is higher than the second layout score;
associating the first video clip with the first layout;
determining pixel coordinates associated with the first video clip within a video frame of the video summarization, the pixel coordinates associated with the first video clip; and
determining that the first video clip is to begin playback in the video summarization before playback of the second video clip.

13. A system, comprising:
at least one processor; and
at least one memory including instructions that, when executed by the at least one processor, cause the system to:
receive video data;
receive annotation data associated with the video data;
receive a theme identifier indicating a theme associated with a video summarization;
determine a configuration for the video summarization based on at least one of the annotation data and the theme identifier;
select a first video clip from the video data;
select a second video clip from the video data;
determine a first similarity score that corresponds to a first similarity between the first video clip and the second video clip;
determine an overall diversity score indicating a diversity of content included in the video data;
determine a first layout for the video summarization, the first layout indicating first pixel coordinates associated with the first video clip within a video frame of the video summarization;
determine, based at least in part on the first similarity score and the overall diversity score, an output length for the video summarization; and
determine that the first video clip is to begin playback in the video summarization before playback of the second video clip.

14. The system of claim 13, wherein the at least one memory further includes instructions that, when executed by the at least one processor, further cause the system to:
determine a first priority metric that corresponds to interest in at least a portion of a third video clip;
determine that the first priority metric is above a first threshold; and
select the third video clip to include in the video summarization.

15. The system of claim 14, wherein the at least one memory further includes instructions that, when executed by the at least one processor, further cause the system to:
determine first characteristic data associated with the first video clip and the second video clip;
determine that the first priority metric is below a second threshold;
determine that the first priority metric is above a third threshold lower than the second threshold;
determine, based on the first characteristic data, a second similarity score that corresponds to a similarity between a portion of the third video clip and the first video clip;
determine that the second similarity score is below a fourth threshold; and determine that the third video clip is to begin playback in the video summarization after playback of the first video clip and before playback of the second video clip.

16. The system of claim 13, wherein the at least one memory further includes instructions that, when executed by the at least one processor, further cause the system to:
receive selected characteristic data associated with the video summarization;
determine, based on the annotation data and the selected characteristic data, a third priority metric that corresponds to interest in at least a portion of a third video clip;
determine that the third priority metric is above a threshold; and
select the third video clip to include in the video summarization.

17. The system of claim 13, wherein the at least one memory further includes instructions that, when executed by the at least one processor, further cause the system to:
determine a duration associated with the video data; and
determine a number of video clips included in the video data,
wherein the output length is further based at least in part on the duration and the number of video clips.

18. The system of claim 13, wherein the at least one memory further includes instructions that, when executed by the at least one processor, further cause the system to:
determine, based on the theme identifier, a first layout score associated with the first layout;
determine a second layout including the first video clip;
determine, based on the theme identifier, a second layout score associated with the second layout;
determine that the first layout score is higher than the second layout score;
associate the first video clip with the first layout; and
determine the first pixel coordinates associated with the first video clip.

19. The system of claim 13, wherein the at least one memory further includes instructions that, when executed by the at least one processor, further cause the system to:
displaying the video summarization;
receive input modifying a portion of the video summarization;
generate a second edit decision list based on the input; and
generate a second video summarization using the second edit decision list.

20. A system, comprising:
at least one processor; and
at least one memory including instructions that, when executed by the at least one processor, cause the system to:
receive video data;
receive annotation data associated with the video data;
receive a theme identifier indicating a theme associated with a video summarization;
determine a configuration for the video summarization based on at least one of the annotation data and the theme identifier;
select a first video clip from the video data;
select a second video clip from the video data;
determine a first layout for the video summarization, the first layout including the first video clip;
determine, based on the theme identifier, a first layout score associated with the first layout;
determine a second layout for the video summarization, the second layout including the first video clip;
determine, based on the theme identifier, a second layout score associated with the second layout;
determine that the first layout score is higher than the second layout score;
associate the first video clip with the first layout;
determine pixel coordinates associated with the first video clip within a video frame of the video summarization, the pixel coordinates associated with the first video clip; and
determine that the first video clip is to begin playback in the video summarization before playback of the second video clip.

* * * * *